(12) United States Patent
Ingersoll et al.

(10) Patent No.: US 8,286,659 B2
(45) Date of Patent: Oct. 16, 2012

(54) COMPRESSOR AND/OR EXPANDER DEVICE

(75) Inventors: Eric D. Ingersoll, Cambridge, MA (US); Justin A. Aborn, Hingham, MA (US)

(73) Assignee: General Compression, Inc., Newton, MA (US)

( * ) Notice: Subject to any disclaimer, the term of this patent is extended or adjusted under 35 U.S.C. 154(b) by 0 days.

(21) Appl. No.: 12/785,100

(22) Filed: May 21, 2010

(65) Prior Publication Data

US 2011/0061741 A1 Mar. 17, 2011

Related U.S. Application Data

(60) Provisional application No. 61/216,942, filed on May 22, 2009.

(51) Int. Cl.
*B65B 25/04* (2006.01)
*F15B 3/00* (2006.01)

(52) U.S. Cl. .......... 137/208; 137/263; 137/574; 60/398; 60/415; 60/416; 165/109.1

(58) Field of Classification Search .................. 137/206, 137/209, 263, 264, 266, 571, 574, 576, 208; 60/398, 415, 416; 91/4 R, 4 A; 417/92, 103, 417/207; 165/109.1
See application file for complete search history.

(56) References Cited

U.S. PATENT DOCUMENTS

| | | | | |
|---|---|---|---|---|
| 37,258 A | * | 12/1862 | Miller | 165/109.1 |
| 1,045,961 A | | 12/1912 | Ferranti | |
| 1,230,028 A | * | 6/1917 | Rardon | 137/209 |
| 1,918,789 A | * | 7/1933 | Titsworth | 417/103 |
| 1,947,304 A | * | 2/1934 | Morro | 137/208 |
| 2,005,515 A | * | 6/1935 | Winkler | 165/109.1 |
| 2,145,540 A | | 1/1939 | Ellis | |
| 2,339,086 A | * | 1/1944 | Makaroff | 60/415 |
| 2,479,856 A | | 8/1949 | Mitton | |
| 2,898,183 A | | 8/1959 | Fauser | |

(Continued)

FOREIGN PATENT DOCUMENTS

GB 2013318 A 8/1979

(Continued)

OTHER PUBLICATIONS

First Action Interview Pilot Program Pre-Interview Communication for U.S. Appl. No. 12/977,724, mailed Oct. 28, 2011.

(Continued)

*Primary Examiner* — John Rivell
(74) *Attorney, Agent, or Firm* — Goodwin Procter LLP

(57) ABSTRACT

Systems and methods for operating a hydraulically actuated device/system are described herein. For example, systems and methods for the compression and/or expansion of gas can include at least one pressure vessel defining an interior region for retaining at least one of a volume of liquid or a volume of gas and an actuator coupled to and in fluid communication with the pressure vessel. The actuator can have a first mode of operation in which a volume of liquid disposed within the pressure vessel is moved to compress and move gas out of the pressure vessel. The actuator can have a second mode of operation in which a volume of liquid disposed within the pressure vessel is moved by an expanding gas entering the pressure vessel. The system can further include a heat transfer device configured to transfer heat to or from the at least one of a volume of liquid or a volume of gas retained by the pressure vessel.

11 Claims, 20 Drawing Sheets

U.S. PATENT DOCUMENTS

| | | |
|---|---|---|
| 3,014,639 A | 12/1961 | Boli |
| 3,100,965 A | 8/1963 | Blackburn |
| 3,232,524 A | 2/1966 | Rice at al. |
| 3,530,681 A | 9/1970 | Dehne |
| 3,618,470 A | 11/1971 | Mueller et al. |
| 3,633,663 A * | 1/1972 | Tafel ..................... 165/109.1 |
| 3,648,458 A | 3/1972 | McAlister |
| 3,677,008 A | 7/1972 | Koutz |
| 3,792,643 A | 2/1974 | Scheafer |
| 3,818,801 A | 6/1974 | Kime |
| 3,832,851 A | 9/1974 | Kiernan |
| 3,854,301 A | 12/1974 | Cytryn |
| 3,901,033 A | 8/1975 | McAlister |
| 3,958,899 A | 5/1976 | Coleman, Jr. et al. |
| 3,968,732 A | 7/1976 | Fitzgerald |
| 4,150,547 A | 4/1979 | Hobson |
| 4,215,548 A | 8/1980 | Beremand |
| 4,348,863 A | 9/1982 | Taylor et al. |
| 4,466,244 A | 8/1984 | Wu |
| 4,478,556 A | 10/1984 | Gozzi |
| 4,537,558 A | 8/1985 | Tsunoda et al. |
| 4,561,494 A | 12/1985 | Frost |
| 4,585,039 A | 4/1986 | Hamilton |
| 4,593,202 A | 6/1986 | Dickinson |
| 4,603,551 A | 8/1986 | Wood |
| 4,610,369 A | 9/1986 | Mercier |
| 4,706,685 A | 11/1987 | Jones, Jr. et al. |
| 4,714,411 A | 12/1987 | Searle |
| 4,761,118 A | 8/1988 | Zanarini |
| 4,765,225 A | 8/1988 | Birchard |
| 4,784,579 A | 11/1988 | Gazzera |
| 4,849,648 A | 7/1989 | Longardner |
| 4,959,958 A * | 10/1990 | Nishikawa et al. .............. 60/415 |
| 5,099,648 A | 3/1992 | Angle |
| 5,138,936 A | 8/1992 | Kent |
| 5,142,870 A | 9/1992 | Angle |
| 5,161,865 A | 11/1992 | Higashimate et al. |
| 5,169,295 A | 12/1992 | Stogner et al. |
| 5,179,837 A | 1/1993 | Sieber |
| 5,184,936 A * | 2/1993 | Nojima ..................... 60/398 |
| 5,253,619 A | 10/1993 | Richeson et al. |
| 5,259,738 A | 11/1993 | Salter et al. |
| 5,322,418 A | 6/1994 | Comer |
| 5,387,089 A | 2/1995 | Stogner et al. |
| 5,394,695 A | 3/1995 | Sieber |
| 5,537,822 A | 7/1996 | Shnaid et al. |
| 5,564,912 A | 10/1996 | Peck et al. |
| 5,579,640 A | 12/1996 | Gray, Jr. et al. |
| 5,584,664 A | 12/1996 | Elliott et al. |
| 5,622,478 A | 4/1997 | Elliott et al. |
| 5,634,340 A | 6/1997 | Grennan |
| 5,674,053 A | 10/1997 | Paul et al. |
| 5,716,197 A | 2/1998 | Paul et al. |
| 5,769,610 A | 6/1998 | Paul et al. |
| 5,771,693 A | 6/1998 | Coney |
| 5,782,612 A | 7/1998 | Margardt |
| 5,807,083 A | 9/1998 | Tomoiu |
| 5,839,270 A | 11/1998 | Jirnov et al. |
| 5,863,186 A | 1/1999 | Green et al. |
| 5,993,170 A | 11/1999 | Stevens et al. |
| 6,026,349 A | 2/2000 | Heneman |
| 6,052,992 A | 4/2000 | Eroshenko |
| 6,113,357 A | 9/2000 | Dobbs |
| 6,145,311 A | 11/2000 | Cyphelly |
| 6,206,660 B1 | 3/2001 | Coney et al. |
| RE37,603 E | 3/2002 | Coney |
| 6,371,145 B1 | 4/2002 | Bardon |
| 6,371,733 B1 | 4/2002 | Renfro |
| 6,397,794 B1 | 6/2002 | Sanderson et al. |
| 6,446,587 B1 | 9/2002 | Sanderson et al. |
| 6,460,450 B1 | 10/2002 | Sanderson et al. |
| 6,499,288 B1 | 12/2002 | Knight |
| 6,558,134 B2 | 5/2003 | Serafin et al. |
| 6,568,169 B2 | 5/2003 | Conde et al. |
| 6,568,911 B1 | 5/2003 | Brightwell et al. |
| 6,638,024 B1 | 10/2003 | Hancock |
| 6,652,241 B1 | 11/2003 | Alder |
| 6,652,243 B2 | 11/2003 | Krasnov |
| 6,655,155 B2 | 12/2003 | Bishop |
| 6,695,591 B2 | 2/2004 | Grimmer et al. |
| 6,711,984 B2 | 3/2004 | Tagge et al. |
| 6,725,671 B2 | 4/2004 | Bishop |
| 6,733,253 B2 | 5/2004 | Vockroth |
| 6,817,185 B2 | 11/2004 | Coney et al. |
| 6,829,978 B2 | 12/2004 | Sanderson et al. |
| 6,854,377 B2 | 2/2005 | Sanderson et al. |
| 6,913,447 B2 | 7/2005 | Fox et al. |
| 6,915,765 B1 | 7/2005 | Sanderson et al. |
| 6,925,973 B1 | 8/2005 | Sanderson et al. |
| 6,957,632 B1 | 10/2005 | Carlson et al. |
| 6,959,546 B2 | 11/2005 | Corcoran |
| 6,994,104 B2 | 2/2006 | Bishop et al. |
| 6,997,685 B2 | 2/2006 | Lemmen |
| 7,001,158 B2 | 2/2006 | Dunn |
| 7,007,589 B1 | 3/2006 | Sanderson |
| 7,011,469 B2 | 3/2006 | Sanderson et al. |
| 7,021,602 B2 | 4/2006 | Davis et al. |
| 7,210,496 B2 | 5/2007 | Suzuki |
| 7,219,682 B2 * | 5/2007 | Agnew et al. ................. 137/263 |
| 7,257,952 B2 | 8/2007 | Bishop et al. |
| 7,308,361 B2 | 12/2007 | Enis et al. |
| 7,377,492 B2 | 5/2008 | Vrana et al. |
| 7,395,748 B2 | 7/2008 | Krimbacher |
| 7,488,159 B2 | 2/2009 | Bhatt et al. |
| 7,527,482 B2 | 5/2009 | Ursan et al. |
| 7,530,300 B2 * | 5/2009 | Hornstein ....................... 91/4 R |
| 7,543,668 B1 | 6/2009 | Schechter |
| 7,604,064 B2 | 10/2009 | Irwin, Jr. |
| 7,610,955 B2 | 11/2009 | Irwin, Jr. |
| 7,640,736 B2 | 1/2010 | Arbel et al. |
| 7,656,055 B2 | 2/2010 | Torres et al. |
| 7,663,255 B2 | 2/2010 | Kim et al. |
| 7,696,632 B1 | 4/2010 | Fuller |
| 7,802,426 B2 | 9/2010 | Bollinger |
| 7,832,207 B2 | 11/2010 | McBride et al. |
| 7,874,155 B2 | 1/2011 | McBride et al. |
| 7,900,444 B1 | 3/2011 | McBride et al. |
| 2003/0180155 A1 | 9/2003 | Coney et al. |
| 2005/0180864 A1 | 8/2005 | Ursan et al. |
| 2006/0078445 A1 | 4/2006 | Carter, III et al. |
| 2006/0218908 A1 | 10/2006 | Abou-Raphael |
| 2006/0248886 A1 | 11/2006 | Ma |
| 2007/0187918 A1 | 8/2007 | Mizuno |
| 2008/0060862 A1 | 3/2008 | Schlele et al. |
| 2008/0163618 A1 | 7/2008 | Paul |
| 2009/0260361 A1 | 10/2009 | Prueitt |
| 2009/0282822 A1 | 11/2009 | McBride et al. |
| 2009/0301089 A1 | 12/2009 | Bollinger |
| 2010/0018196 A1 | 1/2010 | Li et al. |
| 2010/0089063 A1 | 4/2010 | McBride et al. |
| 2010/0139277 A1 | 6/2010 | McBride et al. |
| 2010/0205960 A1 | 8/2010 | McBride et al. |
| 2010/0229544 A1 | 9/2010 | Bollinger et al. |
| 2010/0307156 A1 | 12/2010 | Bollinger et al. |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061836 A1 | 3/2011 | Ingersoll et al. |
| 2011/0062166 A1 | 3/2011 | Ingersoll et al. |
| 2011/0079010 A1 | 4/2011 | McBride et al. |
| 2011/0083438 A1 | 4/2011 | McBride et al. |
| 2011/0131966 A1 | 6/2011 | McBride et al. |
| 2011/0167813 A1 | 7/2011 | McBride et al. |
| 2011/0258996 A1 | 10/2011 | Ingersoll et al. |

| | | | |
|---|---|---|---|
| 2011/0258999 | A1 | 10/2011 | Ingersoll et al. |
| 2011/0259001 | A1 | 10/2011 | McBride et al. |
| 2011/0259442 | A1 | 10/2011 | McBride et al. |

FOREIGN PATENT DOCUMENTS

| | | |
|---|---|---|
| WO | WO 90/03516 A1 | 4/1990 |
| WO | WO 93/06367 A1 | 4/1993 |
| WO | WO 98/17492 | 4/1998 |
| WO | WO 2005/069847 A2 | 4/2005 |
| WO | WO 2008/139267 | 11/2008 |
| WO | WO 2009/034548 | 3/2009 |
| WO | WO 2010/135658 | 11/2010 |
| WO | WO 2011/079267 | 6/2011 |
| WO | WO 2011/079271 | 6/2011 |

OTHER PUBLICATIONS

International Search Report and Written Opinion for International Application No. PCTIUS2010/035795, mailed Oct. 13, 2011.

Office Action for U.S. Appl. No. 12/785,093, mailed Oct. 31, 2011, 7 pages.

Moore, J. J. et al., "Conceptual Design Study of Hydraulic Compression for Wind Turbine Driven Air Compression," Final Report, SwRI Project No. 18.18094.01.016, Jun. 6, 2008, Southwest Research institute, 50 pages.

Sanderson Engine Development, "Application of Sanderson Mechanism for Conversion Between Linear and Rotary Motion," [online], [retrieved on May 8, 2008]. Retrieved from the Internet: <URL: http://www.sandersonengine.com/html/projects.html>, 2 pages.

Carbon Trust, "Hydraulic Transmission System for Large Wind Turbines," Jan. 2007, 1 page.

Erbe, R., "Water Works: Less Expensive Than Oil and Environmentally Friendly, Water-Based Hydraulics Deserve a Closer Look," Machine Design, Sep. 13, 2007, vol. 116, 5 pages.

Simetric, "Mass, Weight, Density or Specific Gravity of Liquids," [online], [retrieved on Jan. 2, 2008]. Retrieved from the Internet: <URL: http://www.simetric.co.uk/si_liquids.htm>, 5 pages.

Ahrens, F. W., "Preliminary Evaluation of the Use of Hydraulic Air Compressors in Water-Compensated Reservoir Compressed Air Storage Power Plants," NTIS, Prepared for CAES Technology Symposium 1978, May 15-17, 1978, Pacific Grove, CA, Argonne National Laboratory, Argonne, Illinois, 24 pages.

"Swash-plate Type Axial Piston Pumps for Open Circuits in General Industrial Machinery," Kawasaki K3VG, Kawasaki Motor Corp., USA, 2006, 24 pages.

Hydraulics & Pneumatics, Piston Pumps [online], [retrieved on Oct. 17, 2007]. Retrieved from the Internet: <URL: http://www.hydraulicspneumatics.com/200/FPE/pumps/article/true/6402>, 2007, Penton Media, Inc., 4 pages.

Hydraulics & Pneumatics, Wobble-Plate Piston Pump [online], [retrieved on Oct. 18, 2007]. Retrieved from the Internet: <URL: http://www.hydraulicspneumatics.com/200/issue/article/true/43640>, 2007, Penton Media, Inc., 13 pages.

Sanderson, A. E., "Hydraulic System for Control of Power Windmills," undated, 11 pages.

Berghmans, J. A. et al., "Performance of a Hydraulic Air Compressor for Use in Compressed Air Energy Storage Power Systems," Smithsonian/NASA ADS Physics Abstract Service, Presented at Symp. on Fluids Eng. in Advanced Energy Conversion Systems, ASME Winter Ann. Meeting, San Francisco, Dec. 10-15, 1978, 2 pages.

International Search Report and Written Opinion for International Application No. PCT/US2010/062010, mailed Apr. 13, 2011.

PCT Invitation to Pay Additional Fees and Communication Relating to the Results of the Partial International Search for International Application No. PCT/US2010/035795 Dated May 31, 2011 6. pages.

Office Action for U.S. Appl. No. 13/294,660, mailed Jan. 18, 2012, 7 pages.

International Search Report and Written Opinion for International Application No. PCT/US2010/062016, mailed Jan. 19, 2012.

Cyphelly et al., "Usage of Compressed Air Storage Systems," Program Elektricity, Final Report May 2004, Ordered by the Swiss Federal Office of Energy.

* cited by examiner

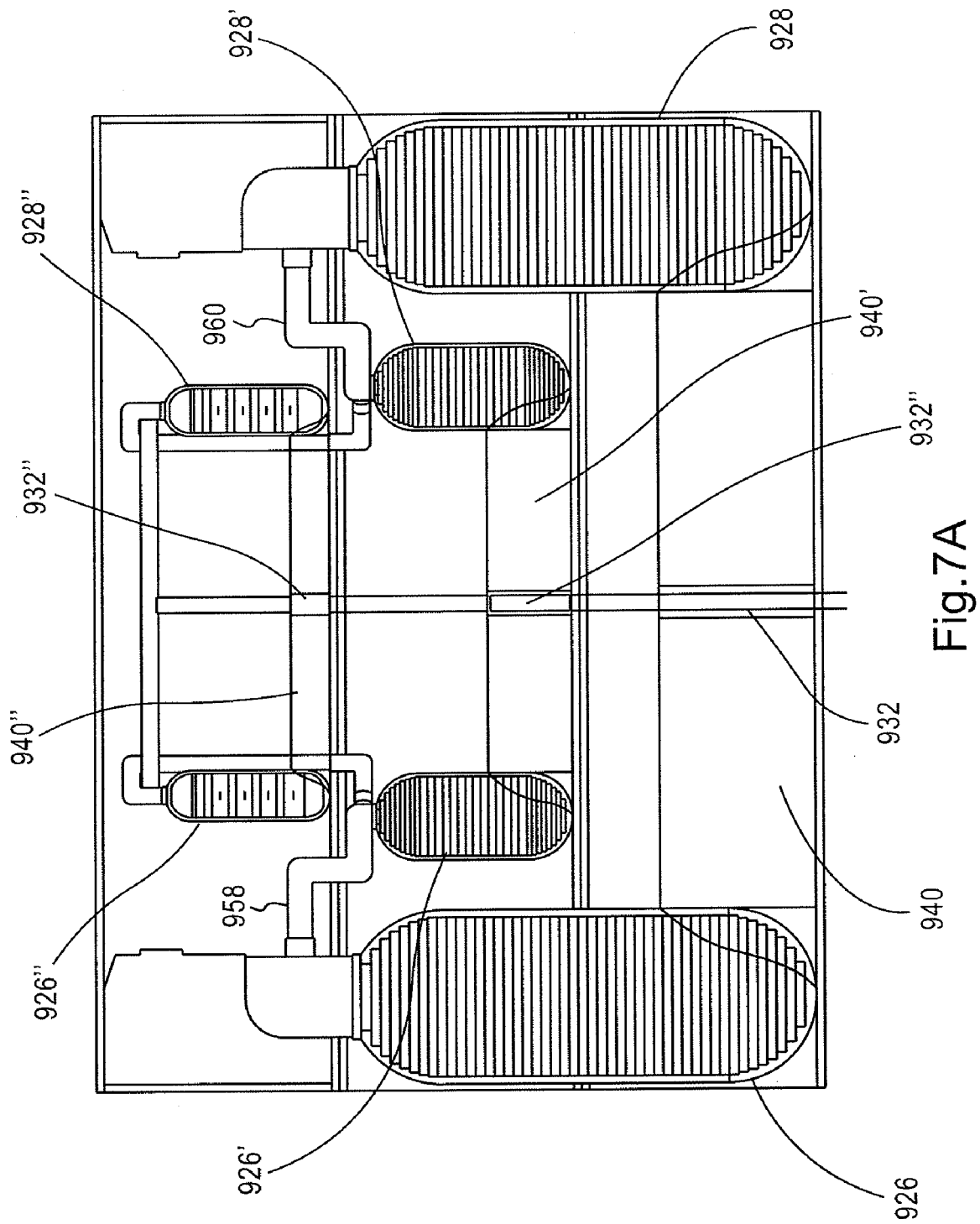

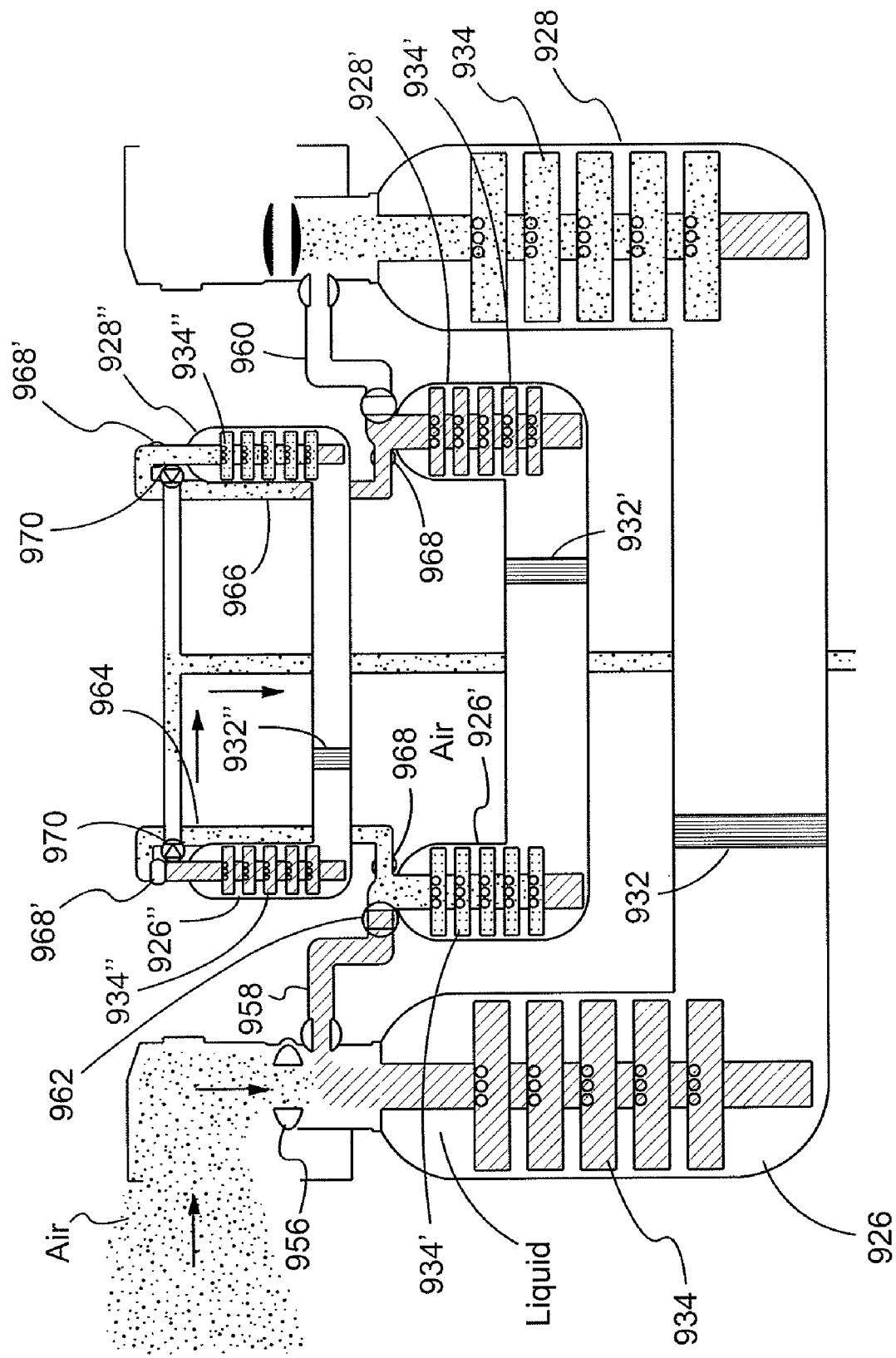

COMPRESSOR AND/OR EXPANDER DEVICE

CROSS REFERENCE TO RELATED APPLICATIONS

This application claims priority to and the benefit of U.S. Provisional Patent Application Ser. No. 61/216,942, filed May 22, 2009, entitled "Compressor and/or Expander Device," the disclosure of which is hereby incorporated by reference in its entirety.

BACKGROUND

The invention relates generally to systems, devices and methods for the compression and/or expansion of a gas, such as air, and particularly to a device that includes features that allow heat exchange from and/or to gas that is being compressed and/or expanded.

Traditionally, electric power plants have been sized to accommodate peak power demand. Electric power plants can be constrained in terms of how quickly they can start-up and shut-down, and it is commonly infeasible to completely shut-down a power plant. The combination of power output constraints, and start-up and shut-down constraints, restricts a power plant's ability to optimally meet a fluctuating power demand. These restrictions may lead to increased green house gas emissions, increased overall fuel consumption, and/or to potentially higher operating costs, among other drawbacks. Augmenting a power plant with an energy storage system may create an ability to store power for later use, which may allow a power plant to fulfill fluctuating consumer demand in a fashion that minimizes these drawbacks.

An energy storage system may improve overall operating costs, reliability, and/or emissions profiles for electric power plants. Existing energy storage technologies, however, have drawbacks. By way of example, batteries, flywheels, capacitors and fuel cells may provide fast response times and may be helpful to compensate for temporary blackouts, but have limited energy storage capabilities and may be costly to implement. Installations of other larger capacity systems, such as pumped hydro systems, require particular geological formations that are not be available at all locations.

Intermittent electric power production sites, such as some wind farms, may have capacities that exceed transmission capabilities. Absent suitable energy storage systems, such intermittent power production sites may not be capable of operating at full capacity. Intermittent production sites may benefit from a storage system that can be sized to store energy, when the production site is capable of producing energy at rates higher than may be transmitted. The energy that is stored may be released through the transmission lines when power produced by the intermittent site is lower than transmission line capacity.

Compressed air energy storage (CAES) systems are another known type of system in limited use for storing energy in the form of compressed air. CAES systems may be used to store energy, in the form of compressed air, when electricity demand is low, typically during the night, and then to release the energy when demand is high, typically during the day. Such systems include a compressor that operates, often at a constant speed, to compress air for storage. Turbines and turboexpanders, separate from the compressor, are typically used to expand compressed air to produce electricity. Turbines and turboexpanders, however, often require the compressed air to be provided at a relatively constant pressure, such as around 35 atmospheres. Additionally or alternatively, air at pressures higher than 35 atmospheres may need to be throttled prior to expansion in the turbine, causing additional losses that also reduce the efficiency of the system, and/or reduce the energy density that a storage structure may accommodate. Additionally, to increase electrical energy produced per unit of air expanded through the turbine, compressed air in such systems is often pre-heated to elevated temperatures (e.g., 1,000° C.) prior to expansion by burning fossil fuels that increases the cost of storing energy, reduces overall efficiency, and produces emissions associated with the storage of energy.

Known CAES-type systems for storing energy as compressed air have a multi-stage compressor that may include intercoolers that cool air between stages of compression and/or after coolers that cool air after compression. In such a system, for intercoolers to work efficiently, however, the air must still achieve substantial temperatures during each stage of compression, prior to being cooled, which will introduce inefficiencies in the system. Thus, there is a need to provide for CAES type systems that have improved efficiencies.

SUMMARY OF THE INVENTION

Systems and methods for operating a hydraulically actuated device/system are described herein. In one embodiment, a system includes at least one pressure vessel defining an interior region for retaining at least one of a volume of liquid or a volume of gas and an actuator coupled to and in fluid communication with the pressure vessel. The actuator can have a first mode of operation in which a volume of liquid disposed within the pressure vessel is moved to compress and move gas out of the pressure vessel. The actuator can have a second mode of operation in which a volume of liquid disposed within the pressure vessel is moved by an expanding gas entering the pressure vessel. The system can further include a heat transfer device configured to transfer heat to or from the at least one of a volume of liquid or a volume of gas retained by the pressure vessel.

BRIEF DESCRIPTION OF THE DRAWINGS

FIG. 7A shows a multi-stage compressor/expander device, according to one embodiment.

FIGS. 7B-7E show the multi-stage compressor/expander device of FIG. 7A in various stages during a compression cycle.

FIGS. 7F-7I show the multi-stage compressor/expander device of FIG. 7A in various stages during an expansion cycle.

DETAILED DESCRIPTION

Figure 1:
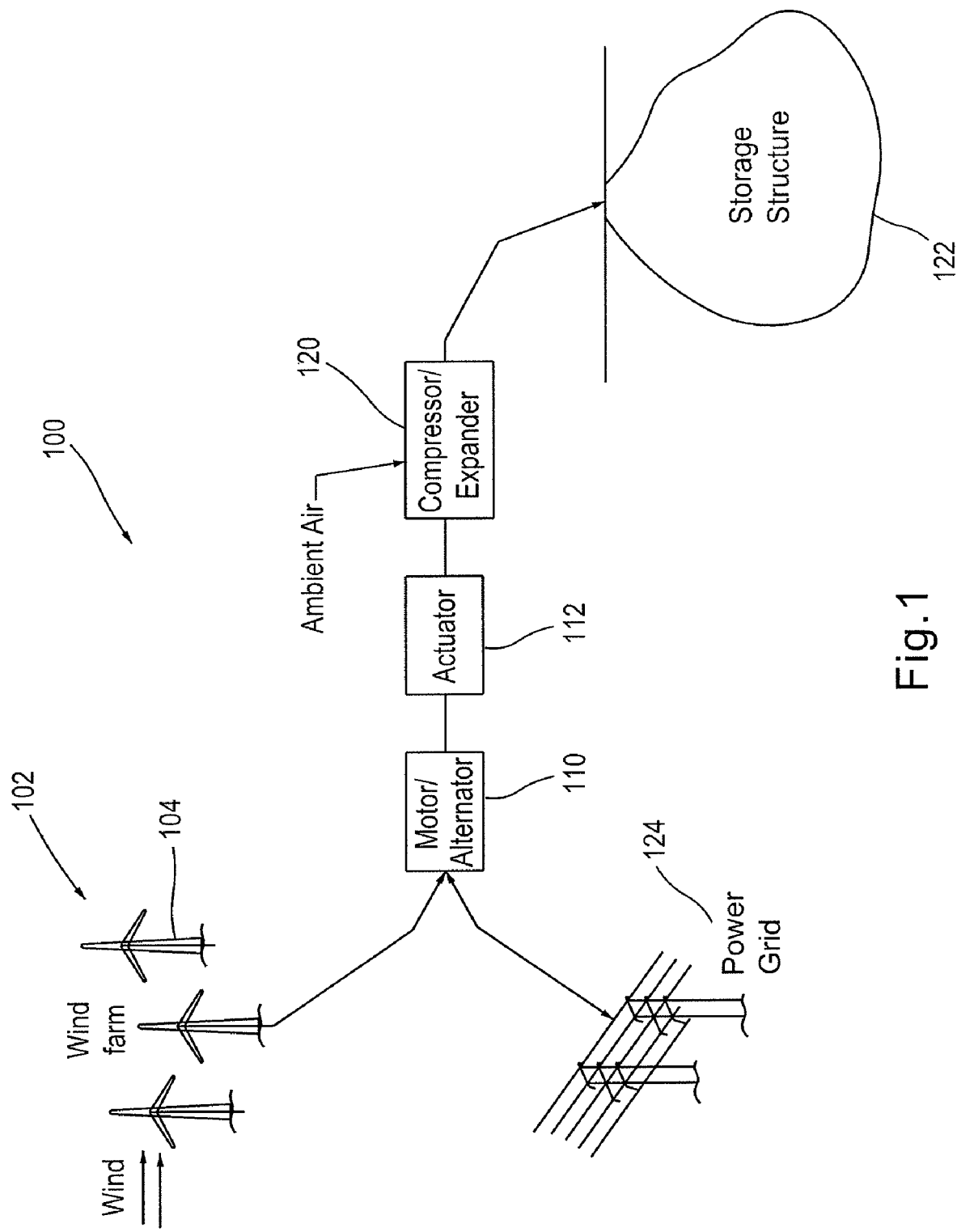
FIG. 1 is a schematic illustration of an air compression and expansion energy system according to an embodiment.

System and methods to store energy as a compressed gas, such as air, and/or generate energy from stored, compressed gas, at improved efficiencies are disclosed herein. Aspects of the device may relate to improvements in thermodynamic and/or mechanical efficiency during the compression of air and during the expansion of air.

The energy flow characteristics of air compression consist of a combination of various energy flows, including "work energy flow" and "heat energy flow". Those familiar with the art will understand the distinction between the terms: "energy", "work", "heat", "temperature", "pressure", "volume", and "density". This discussion proceeds by using these terms in their thermodynamically-exact sense, but does not take-up teaching the distinction.

A well-known gas compression dynamic is that a gas, such as air, increases in temperature when it is compressed. The thermodynamic concepts of heat and temperature interrelate such that a gas compression process in which no heat flows out of the compressing gas, results in the maximum gas temperature increase. Such a zero heat flow process, is known as an "adiabatic" process. In contrast, if heat flows out of compressing gas at a sufficient rate, the gas may compress with no change in temperature. Such a constant temperature process is known as "isothermal" compression.

For a given gas volume reduction, an adiabatic compression process results in the highest gas pressure, the highest gas temperature, and the highest work consumption. In contrast, for the same volume reduction, an isothermal compression process results in the lowest pressure, lowest gas temperature (i.e. the same as the starting temperature), and lowest work consumption. Processes that involve intermediate levels of heat flow, result in intermediate values of gas pressure, gas temperature, and work consumption. Those skilled in the art will recognize that a perfectly isothermal air compression process is a theoretical extreme that can only be achieved in reality by involving a relatively cold heat sink; regardless it is a useful metric for air compression/expansion discussion and analysis.

Because it may affect pressure, temperature, and work, the ability to approach an isothermal gas compression process may be useful for designing an energy storage device. A fundamental goal for a compressed air energy storage device, is minimizing the work consumed to achieve a certain gas storage condition; defined by the gas's density, temperature, pressure, and volume. While minimizing the work consumed during gas compression is a fundamental goal of an energy storage device, those familiar with the art will recognize the need to attend to the energy flows related to heat; both during compression, and during storage. Moreover, those familiar with the art of machine design will recognize the need to attend to constraints related to pressure and temperature; and will recognize the benefits that may result from lower temperatures and pressures. Those familiar with the art of thermodynamics will recognize that the factors related to gas compression, relate in inverse fashion to gas expansion, and thereby pertain to extracting energy from expanding gas. With respect to an energy storage system, those familiar with the art of thermodynamics and machine design, will recognize, that an isothermal gas compression process alone, is not sufficient to achieve a useful energy storage system, but will also recognize the enabling benefits a near-isothermal process presents.

The work involved with attaining a particular pressure in the compression of air may be reduced by removal of heat from the air during the compression process, decreasing the extra work required as a result of the pressure increase from a rise in temperature. Similarly, the amount of work that can be derived from compressed air, as the air expands to a given pressure, can be increased by the continuous addition of heat preventing the air temperature from dropping during the expansion process.

Heat (i.e., thermal energy) may be removed from air during compression. Removing heat in this manner may reduce the maximum temperature that a system may be designed to accommodate. Additionally, increasing density at a given pressure and removing heat from air may increase the mass of air that can be stored in a given volume of space, and reduce the work required to increase the density of the air at the storage pressure. It is to be appreciated that a given mass of air occupies less space when at a lower temperature. In this regard, providing relatively cooler air to a storage device may increase the total mass of air that may be stored by the system.

Heat may also be removed prior to or during the intake stroke which realizes a number of benefits including higher density air at the beginning of the compression stroke, and drying of humid air. This action is also achieved by exposure of the air during the intake stroke to the heat capacitor structure that has been cooled by the liquid during the preceding compression stroke. In addition, a pre-cooler upstream of the intake can achieve a similar or additional benefit.

Additionally, thermal energy may be added back to the expanding air to raise or maintain its temperature at any time prior to discharging the air to the atmosphere. Adding heat to the compressed air raises the pressure over what it would otherwise be. In this manner, the system can output the same or greater power with a smaller mass flow of air from storage. In other words, more power for the same mass flow.

In some embodiments, one or more features that promote greater heat transfer during compression and/or expansion are provided. Such features may include, but are not limited to, a relatively slow compression and/or expansion cycle, a relatively large heat transfer area for a given volume of air between the air and adjacent surfaces, and/or a low average minimum distance between air in a device and the liquid or structure of the device through which heat is transferred.

In some embodiments, a system includes a compressor/expander device that may be used to compress air, in one operating mode, for storage in a storage structure. The compressed air may be expanded, at a later time, through the same compressor/expander device in a different operating mode to release energy. Heat may be removed from the air during compression and/or added to the air during expansion to improve efficiencies of the device. Roundtrip thermal efficiencies (i.e., efficiencies associated directly with the compressing an amount of air and then later expanding the same amount of air to produce mechanical energy, exclusive of mechanical, electrical, or other parasitic system losses) may be 50% or higher, 60% or higher, 70% or higher, 80% or higher, and even 90% or higher.

In some embodiments, a compressor/expander device can include one or more pressure vessels that are to be at least partially filled with a liquid during at least a portion of a compression and/or expansion cycle. In a compression mode of operation, air can be drawn into the pressure vessel from the atmosphere or received from an upstream compressor as an actuator of the device displaces the liquid from within the vessel to increase the volume available for air in the pressure vessel. The liquid is then moved or pumped into the vessel by the actuator to reduce the volume available for air in the pressure vessel to compress and deliver the air therefrom. In an expansion mode of operation, pressurized air may be received by a pressure vessel to displace the liquid therein and drive the actuator to release and transfer energy from the compressed air. Air that has been expanded may then be discharged from the pressure vessel to the atmosphere, to a downstream compressor/expander device or other device for further expansion as the volume available for air in the pressure vessel is then decreased.

In some embodiments, heat may be transferred from air that is compressed in the pressure vessel to reduce the work required to achieve a given density, which may increase the efficiency of the compression process. In some embodiments, a device that may provide for increased heat transfer include, but is not limited to, a relatively slow operating speed at which compression and/or expansion may occur. In some embodiments, a complete compression or expansion cycle may be slow enough to provide additional time for heat transfer between the air and liquid. Enough heat energy may be transferred, according to some embodiments, to approximate an isothermal compression and/or expansion process, achieving efficiencies associated therewith. Additionally or alternatively, faster speeds may allow larger power levels to be achieved during expansion, isothermally or with temperature changes, which may be desirable at times to system operation.

While recognizing that attending to energy flows is fundamental to designing an energy storage system, to be useful, it is also important for the system to achieve meaningful energy flow rates. Energy flow rate, meaning energy per unit time, is also known as "power". The value of meaningfully high power levels should be clear those skilled in the art. It bears pointing out, however, that a key aspect of the described invention is the heat flow rate it may achieve between compressing/expanding air, and the system's process liquid. Moreover, the key feature that the invention achieves may be the relatively high heat transfer rates it achieves in response to relatively small air temperature changes.

In some embodiments, heat may be transferred from and/or to air that is compressed and/or expanded through liquid that is present in a pressure vessel. As is to be appreciated, an air/liquid interface may move and/or change shape during a compression and/or expansion process in a pressure vessel. This movement and/or shape change may provide a compressor/expander device with a heat transfer surface that can accommodate the changing shape of the internal areas of a pressure vessel through which heat is transferred during compression and/or expansion. In some embodiments, the liquid may allow the volume of air remaining in a pressure vessel after compression to be nearly eliminated or completely eliminated (i.e., zero clearance volume).

Generally speaking, a liquid may have a relatively high thermal capacitance as compared to air such that the liquid may maintain a relatively constant temperature as heat is passed therethrough, buffering the system from substantial temperature changes. Heat that is transferred between the air and liquid, or components of the vessel itself, may be moved from or to the pressure vessel through one or more heat exchangers that are in contact with the liquid or components of the vessel. One type of heat exchanger that may be used to accomplish this is a heat pipe, as discussed in greater detail herein. Thermal control of the air and process liquid may be accomplished by mass transfer, heat transfer or any combination of the two.

In some embodiments, dividers may be positioned inside the volume of a pressure vessel to increase the heat transfer area at heat transfer surfaces, both liquid and solid, of the pressure vessel and air that is being compressed and/or expanded. Methods to increase heat transfer surface area contemplated include the use of fluid to solid and fluid to fluid. Each of the dividers may be shaped and/or may be positioned to trap a volume or pocket of air within a pressure vessel that provides one or more air/liquid interfaces in addition to an interface between the divider and the air (i.e., air/divider interface). The air/liquid interfaces and air/divider interfaces provide surfaces across which heat may be transferred during compression and/or expansion. The dividers may be configured such that the area of the liquid through which heat is transferred, whether directly at air/liquid interfaces or indirectly through portions of a divider at air/divider interfaces, may remain substantially constant, even toward the end of a compression cycle, when only small volumes of air may remain in a pressure vessel. Maintaining large surface areas for heat transfer toward the end of compression may improve efficiency during compression, as this portion of the compression process, absent heat removal, typically experiences the greatest rise in temperature and greatest impairment to compression efficiency. It is to be appreciated that, toward the end of compression, an incremental change in the volume available for air may cause the greatest percent change in the overall volume that is available for air, and consequently, may be associated with a greater change in temperature, absent heat removal. Similar effects may be realized by maintaining a relatively large area for heat transfer to air from liquid and/or the dividers throughout and particularly at the beginning of an expansion cycle.

In some embodiments, dividers that provide an air/liquid interface and a air/divider interface for heat transfer to/from the air may allow structural components of the pressure vessel (e.g., the exterior shell) to be shaped and/or sized for optimal structural and/or shipping constraints, while also increasing areas for heat transfer with air that is being compressed or expanded within the pressure vessel. According to some embodiments, the dividers may include a dish-like or other open ended shape(s) configured to hold a pocket of air within the pressure vessel as air is compressed and/or expanded. The dividers may be arranged to have an opening that faces downwardly to channel the flow of air (i.e., toward the direction in which gravity pulls) when the pressure vessel is oriented in its operational position to help hold pockets of air in contact with liquid also in the pressure vessel.

In some embodiments, dividers that hold pockets of air within a pressure vessel may provide for a reduced average minimum distance between points within the air volume and surfaces in contact with the air from which heat is received or transferred. In some embodiments, the dividers may be arranged in a stack configuration of dish-like structures that trap pockets of air formed as relatively thin layers and that provide a small average minimum distance between points of an air pocket and surfaces in contact with the air. Reducing the average minimum distance, in this respect, reduces the average distance that heat may have to travel, whether through conduction or convection, to or from the air pocket, which may have a higher thermal resistivity than materials across which heat may travel during compression and/or expansion, including liquid in the pressure vessel or the metal of the pressure vessel itself.

In some embodiments, a compressor/expander device can allow a system to achieve efficiencies equal to or greater than those associated with existing compressed air energy storage (CAES) systems with only the use of low-grade heat sources and/or heat sinks (e.g., heat sources typically at temperatures between about 10° C. to 50° C., among other ranges, and heat sinks that are typically at lower ranges of temperatures) and without requiring the energy input associated with fuel that may otherwise be used to heat air during expansion, as in a traditional CAES system. Eliminating or reducing the need to burn fuel to heat air at expansion may allow the compressor/expander device to operate without the production of emissions, or at least without the production of emissions associated directly with the storage and release of energy as compressed air.

A compressor/expander device as described herein can be configured such that movement of a single actuator causes compression of air in a first pressure vessel of the device and also allows for the simultaneous receipt of air in a second pressure vessel of a common stage and that operates in coordination with the first pressure vessel, when operated in a compression mode. In this manner, the actuator may be a double acting device. Similarly, expansion and discharge of air may occur in the first and second pressure vessels, alternately, as an actuator moves back and forth between pressure vessels of a common stage. Additionally or alternatively, compressor/expander devices may be configured in series to form a multi-stage device to help achieve greater air pressures, such as up to 150 psi or greater after a first stage, up to 1,000 psi or greater after a second stage, and/or up to 3,000 psi or greater after a third stage, at improved efficiencies.

A compressor/expander device as described herein can also allow compression and/or expansion to occur across different stages of a multi-stage compressor/expander device; for example, during expansion, intake in one (smaller vessel) while discharge in the other (larger vessel). By way of example, a device may include an upstream pressure vessel (e.g., a first pressure vessel of a first stage) and a downstream pressure vessel (e.g., a first pressure vessel of a second stage) in which air may be compressed at a common time. A change in volume available for air that occurs in the downstream pressure vessel may be less than a change in the volume available for air in the upstream pressure vessel. At the beginning of compression, the volume available for air in each of the upstream pressure vessel and the downstream pressure vessel may be in fluid communication with one another. Additionally, the volume available for air in the downstream pressure vessel may be at a minimum value while the volume available for air in the upstream pressure vessel is at a maximum value. Compression of air may occur in the combined volumes of the upstream pressure vessel and the downstream vessel as the volume available for air in the upstream pressure vessel decreases. The reduction in the volume available for air in the upstream pressure vessel may result in the compression of air, despite an increase in the volume available for air in the downstream pressure vessel since a reduction in the volume available for air in the upstream pressure vessel is greater than an increase in the volume available for air in the downstream pressure vessel.

Embodiments of the compressor/expander device may operate at relatively low speeds, as discussed above, which may result in lower operating temperatures for the device. Lower temperatures and slower speeds at friction surfaces may extend the wear life and/or lend to increased device reliability.

A compressor/expander device may accommodate varying input power levels, as may be associated with wind farms having power outputs that depend on wind levels. According to some embodiments, the compressor/expander device may be a positive displacement device that, unlike centrifugal compressors found in some CAES systems, may efficiently operate over a wide range of speeds or output levels.

A compressor/expander device may also allow for a constant power output for varying compressed air pressure levels of a storage structure. Valves, sensors, and/or other control devices may be incorporated into a compressor/expander device to control a mass of air that is admitted to the device for expansion, regardless of pressure level in a storage structure. In this respect, an amount of energy produced by the device may be maintained relatively constant. Additionally or alternatively, the mass of air admitted to the compressor/expander device may be increased/decreased, when desired and when storage structure pressure levels permit, such that additional/reduced power may be produced. Rate of compression/expansion can be varied by the amount of air taken in or the speed of the stroke or both.

A compressor/expander device may be constructed modularly to allow a plurality of devices to be sized together relatively easily for different applications. According to some embodiments, individual compressor/expander devices may be sized for power ranges between 1.0 megawatts and 5.0 megawatts, although other sizes are possible. Use of a pre-compressor in-line before the compressor may also be employed to provide initial compression of the air. Multiple compressor/expander devices may be operated in parallel to provide larger power capacities. By way of example, according to one embodiment, one hundred and fifty, 2.0 megawatt devices may be operated in parallel to provide for a 300 megawatt installation. If desired, fewer than the full complement of one hundred and fifty compressor/expander devices may be in operation, with the remaining devices remaining idle, to provide for efficient system operation at varying power levels. Additionally or alternatively, installations of multiple compressor/expander devices may begin operation with less than the full complement of planned devices installed to allow a system to be at least partially operational prior to the system being constructed completely.

FIG. 1 is a schematic illustration of an embodiment of an energy system 100 in which a compressor/expander device may be used to both store energy and release energy that has previously been stored. As shown in FIG. 1, a wind farm 102 including a plurality of wind turbines 104 may be used to harvest and convert wind energy to electric energy for delivery to a motor/alternator 110. It is to be appreciated that the system may be used with electric sources other than wind farms, such as, for example, with the electric power grid, or solar power sources. The motor/alternator 110 drives an actuator 112 connected to a compressor/expander device 120.

Energy can be stored within the system 100 in a compressed form and then expanded for use at a later time period. To store energy generated by the wind farm 102, the actuator 112 uses a hydraulic pump (not shown in FIG. 1) to cause liquid in a pressure vessel (not shown in FIG. 1) of the compressor/expander 120 to move or be displaced to increase a volume available within the pressure vessel for the receipt of air. The actuator 112 then compresses the air by causing liquid in the pressure vessel to move or be displaced to decrease the volume available for air in the pressure vessel. During this process, heat is removed from the air. During compression, the air is delivered to a downstream stage of the compressor/expander device 120 and eventually at an elevated pressure to a compressed air storage structure 122 (also referred to herein as "cavern"). At a subsequent time, for example, when there is a relatively high demand for power on the power grid, or when energy prices are high, compressed air may be released from the storage structure 122 and expanded through the compressor/expander device 120. Expansion of the compressed air drives the actuator 112 that, in turn, drives the motor/alternator 110 to produce electricity for delivery to the power grid 124. Heat at a relatively low temperature (e.g., between for example, about 10° C. and about 50° C.) may be added to the air during expansion to increase the power generated during the expansion process.

Figure 2A:
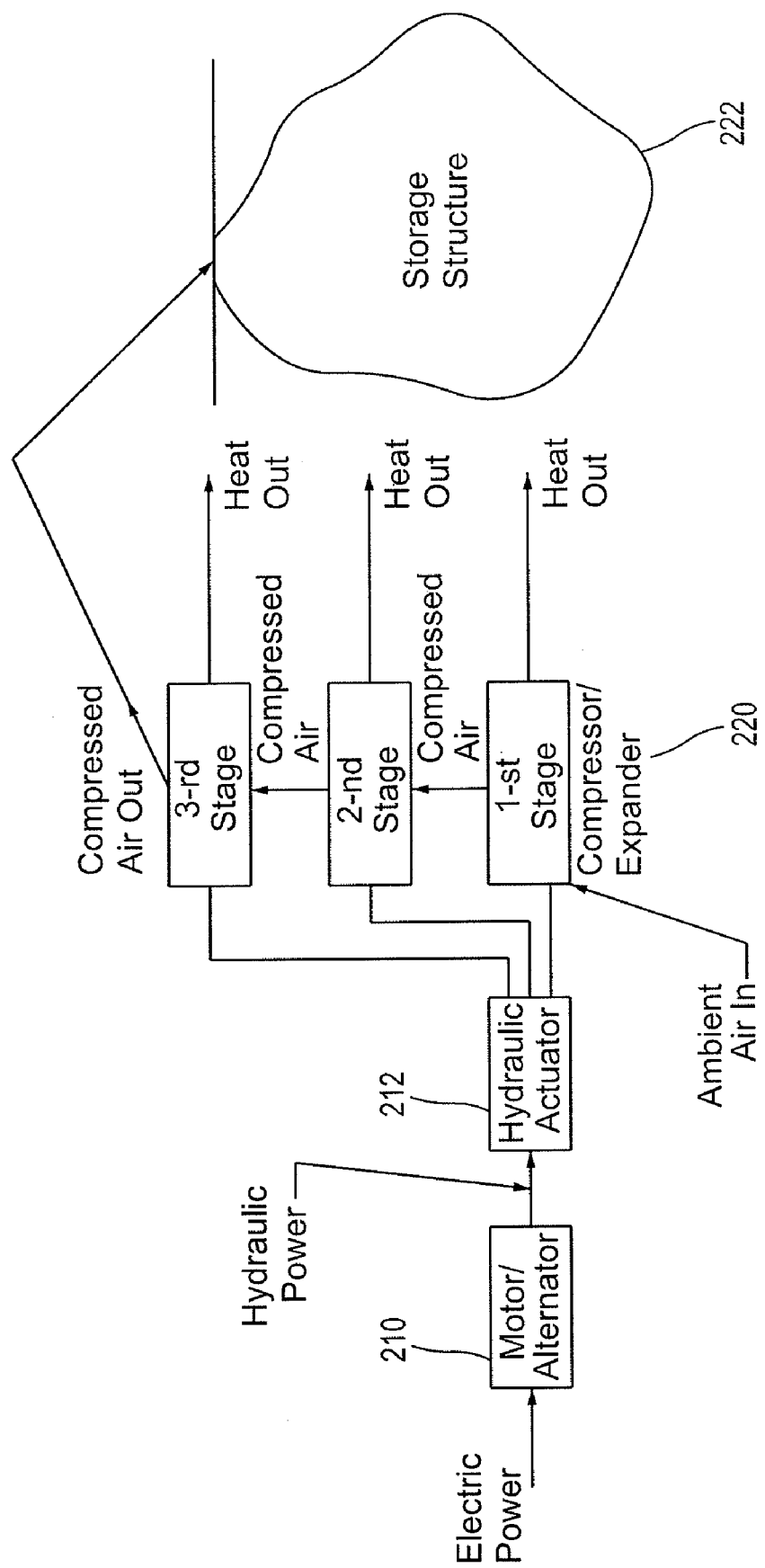
FIG. 2A is a schematic illustration of an air compression and expansion energy system showing the flow of energy during a compression cycle, according to one embodiment

FIG. 2A is a schematic illustration of energy flow through a multi-stage system 200 similar to the system 100 of FIG. 1, at one example operating condition as air is being compressed for storage. As described above, a motor/alternator 210 drives an actuator 212 which can use a hydraulic pump (not shown in FIG. 2A) to cause liquid in a pressure vessel (not shown in FIG. 2A) of the compressor/expander 220 to move or be displaced to increase a volume available within the pressure vessel for the receipt of air. The actuator 212 then compresses the air by causing liquid in the pressure vessel to move or be displaced to decrease the volume available for air in the pressure vessel.

Heat energy is removed during compression via a liquid that is present in one or more pressure vessels (not shown) of a multi-stage compressor/expander device 220 to maintain the air that is being compressed at a relatively constant temperature. The heat energy is transferred from the liquid and the compressor/expander device 220 to a heat sink via a heat exchanger. In another configuration, the heat energy stays in the liquid, and the liquid is discharged out of the compression chamber directly to a heat sink, where it discharges its heat, and is then returned to the pressure vessel. The air may achieve pressures of about, for example, 150 psi, 1,000 psi, and 3,000 psi at each of first, second, and third stages before being delivered to a storage structure 222 at a pressure of about 3,000 psi, according to one embodiment. The temperature of the air, after being provided to the compressor/expander device 220, and initially compressed and cooled, remains relatively constant, such as, for example, at about 5° C., 10° C., 20° C., 30° C. or other temperatures that may be desirable, until discharged to the storage structure 222. Air stored in the storage structure 220 may be heated (or cooled) naturally through conductive, convective, and/or radiative heat transfer if the storage structure 222 is naturally at a higher (or lower) temperature. For example, in some cases, the storage structure may be an underground structure, such as a salt cavern constructed in a salt dome or bedded salt layer that is/are used for storing the compressed air or an above-ground storage tank or vessel. In another embodiment, an above ground storage structure could be painted black and designed to facilitate absorption of solar radiation for heating. In another embodiment, a below ground storage feature could take advantage of geothermal heat. It is to be appreciated that FIG. 2A illustrates one operating condition for one embodiment of a system, and that other operating conditions exist and that other system embodiments are also contemplated.

Figure 2B:
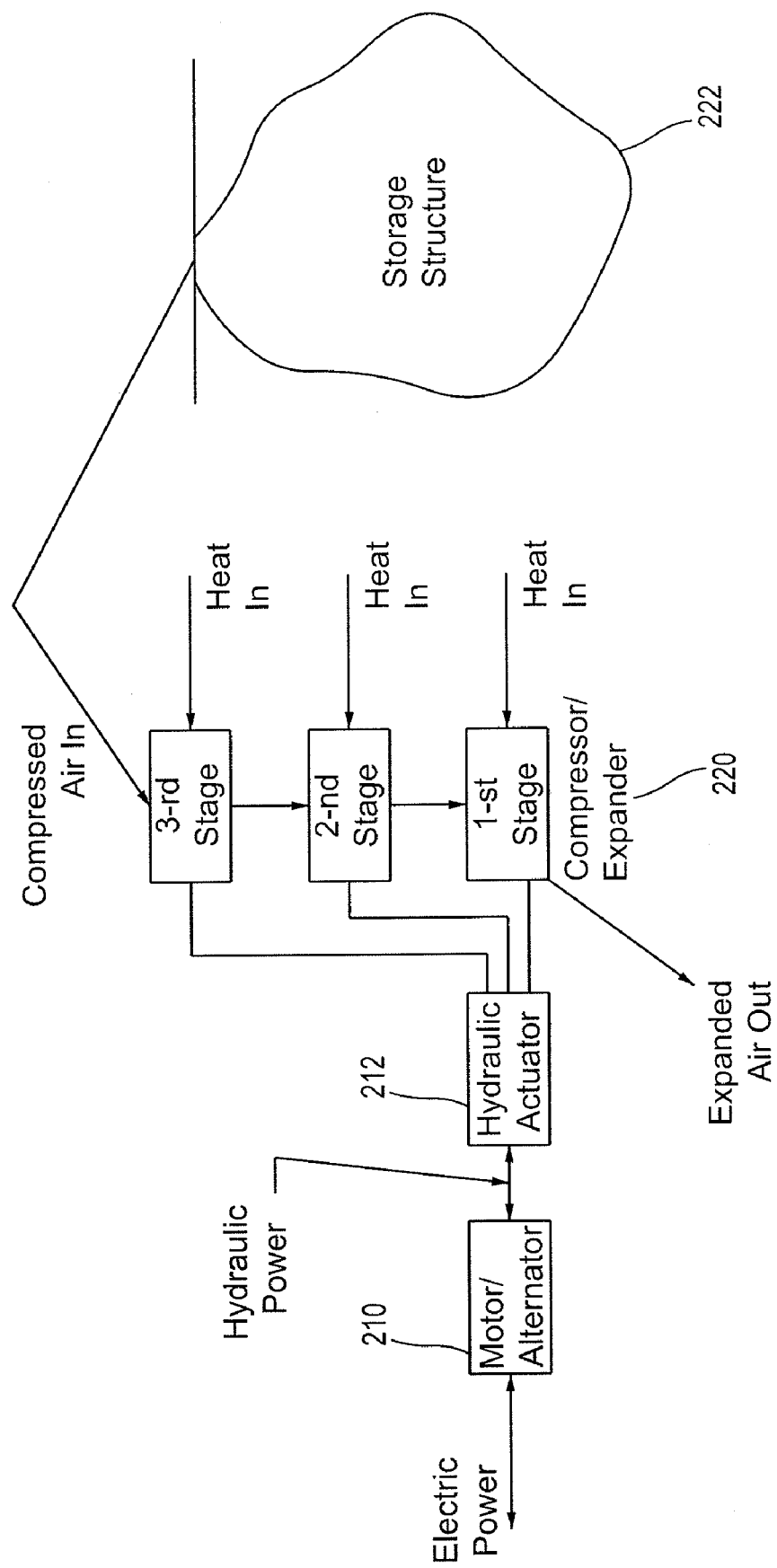
FIG. 2B is a schematic illustration of an air compression and expansion energy system showing the flow of energy during an expansion cycle, according to one embodiment.

FIG. 2B is a schematic representation of energy flow through the system 200 of FIG. 2 at one operating condition, as air is being released from storage for the production of energy. In one example operating condition, air in the storage structure 222 can be at about 3,000 psi, and can be expanded through the third, second, and first stages of the compressor/expander device to gauge pressures of, for example, about 1,000 psi, 150 psi, and 0 psi, respectively. Heat may be added to the air during expansion at each of the third, second, and first stages, respectively, to hold air temperatures at a substantially constant temperature, such as at about 35° C. or other temperatures, during the entire expansion process. It is to be appreciated, that the overall temperature change of air during expansion may be limited by a relatively large amount of air that expands in a relatively small volume of a pressure vessel and that is in contact with substantial heat transfer surfaces. The compressor/expander device 220 produces mechanical power that is converted through one or more hydraulic pumps/motors of the actuator 212, and a motor/alternator 210 is used to produce electric power. It is to be understood that actuators other than hydraulic actuators can alternatively be used.

Figure 3A:
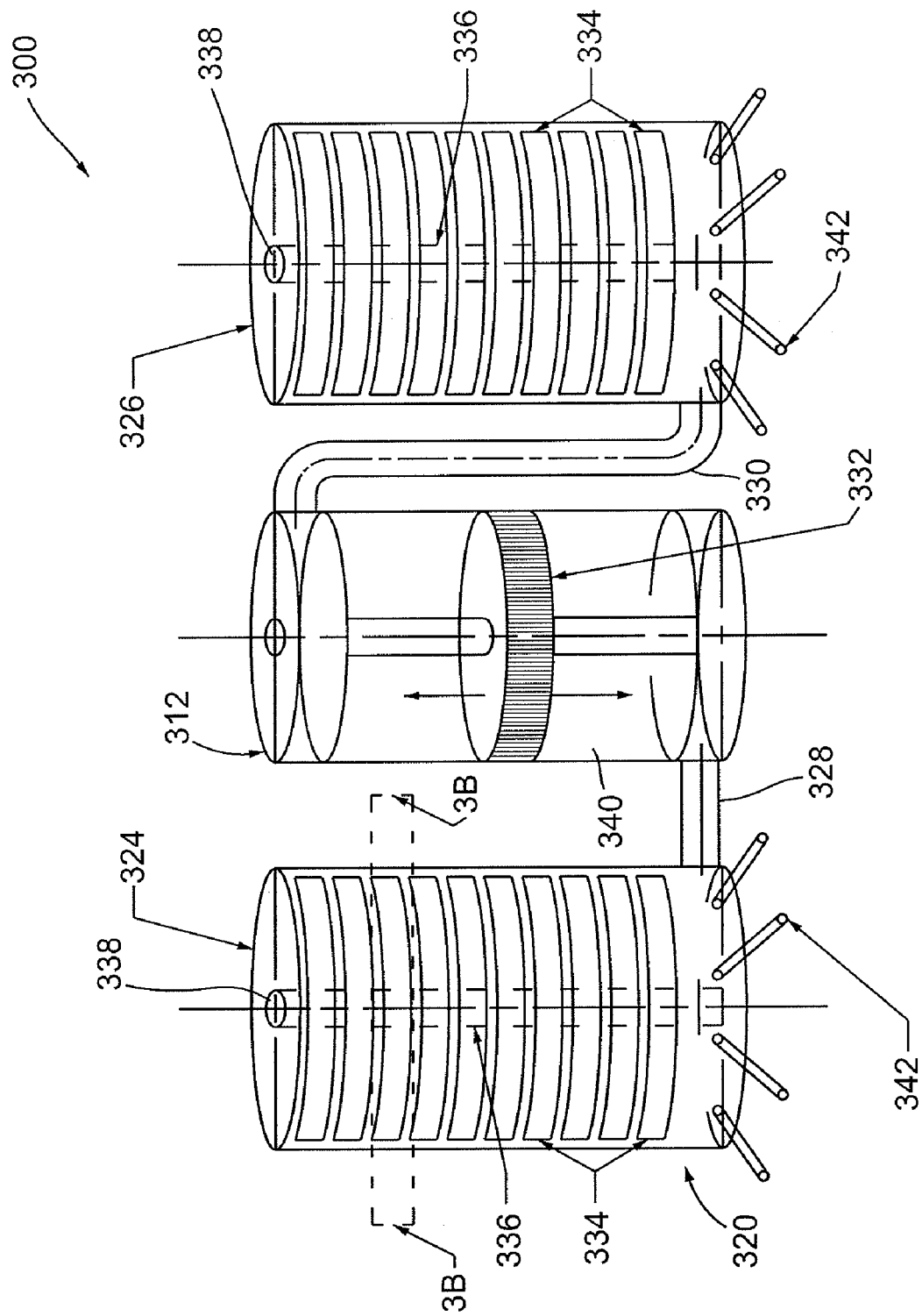
FIG. 3A shows a single stage of one embodiment of a compressor/expander device.

FIG. 3A illustrates a portion of a compressed air storage system 300 that includes a compressor/expander device 320 and an actuator 312. The compressor/expander device 320 illustrates a single stage of a compressed air storage system. The compressor/expander device 320 includes a first pressure vessel 324 and a second pressure vessel 326. The first and second pressure vessels 324, 326 are each coupled fluidly to the actuator 312 by a conduit or housing 328 and 330, respectively. The actuator 312 can include a water pump that includes a hydraulically driven piston 332. The piston 332 is disposed within a housing or reservoir 340 and can be driven with one or more hydraulic pumps (not shown in FIG. 3A) to move toward and away from the conduit 328 of first pressure vessel 324 to alternately reduce and then increase the internal air volume of the first pressure vessel 324 (with an equivalent, but opposite increase and reduction of air volume in the second pressure vessel 326). Each of the first and second pressure vessels 324, 326 are at least partially filled with a liquid, such as water, that is moved by the actuator 312 to alternately compress and drive air from the volume of each of the first and second pressure vessels 324, 326, when operated in a compression mode, or to be moved by compressed air received in either of the first and second pressure vessels 324, 326 when operated in an expansion mode.

The compressor/expander device 320 can also include dividers 334 that can be positioned within the first and second pressure vessels 324, 326. The dividers 334 can increase the overall area within a pressure vessel that is in direct or indirect contact with air, which can improve heat transfer. The dividers 334 can provide for an increased heat transfer area with both air that is being compressed and air that is being expanded (either through an air/liquid interface area or air/divider interface), while allowing the exterior structure and overall shape and size of a pressure vessel to be optimized for other considerations, such as pressure limits and/or shipping size limitations. It is to be appreciated that the dividers may heat up or cool down during each compression event, and that the water or liquid will thermally recharge the dividers back to the temperature of the water during each compression or expansion event, allowing the dividers to act as a rechargeable thermal capacitor. It is also to be appreciated that the dividers could have interior spaces that are occupied with a fluid such as a refrigerant like water, propane, or other refrigerant, and the refrigerant could be cycled outside the compression/expansion chamber to a heat sink/source.

In this embodiment, the dividers 334 are arranged in a stack configuration within the first and second pressure vessels 324 and 326. Each divider 334 can be configured to retain a pocket of air. In one illustrative embodiment, each of the dividers 334 can include an upper wall, a downwardly extending side-wall that may conform in shape and substantially in size to the inner wall of the pressure vessel, and an open bottom. Various shapes of dividers may be used, as shown, for example, in FIGS. 4A-4C, described in more detail below. The open bottom of each of the dividers 334 face in a common, substantially downward direction when the pressure vessel is oriented for operation. It is to be appreciated that although the figures show dividers that conform in size and shape to the interior of the pressure vessels 324, 326, and are generally shaped similarly to one another, other configurations are also possible and contemplated, including embodiments that include dividers that are substantially smaller in width than the interior of a pressure vessel and/or that are shaped and sized differently than one another, among other configurations. Some dividers can be used that do not face any particular direction or contain a pocket of air. Such dividers may be configured to minimize the distance that heat must travel through the air in order to reach the dividers, such as a maximum distance of ⅛ of an inch, and other distances. Such configurations may include parallel dividers, corrugated dividers, intersecting dividers, curved dividers, dividers made out of concentric rings, dividers made out of pressed and/or stamped rolled or sheet metals, and many other shapes and configurations, some of which are or may be routinely used in various thermal transfer devices. Various other shapes and configurations of dividers can be used, such as, for example, the dividers that are shown and described in U.S. Provisional App. No. 61/290,107, entitled "System and Methods for Optimizing Efficiency of a Hydraulically Actuated System," incorporated herein by reference in its entirety.

As shown in FIG. 3A, a manifold 336 can extend centrally through the stack of dividers 334 and fluidly couple each of the dividers 334 to an inlet/outlet port 338 of the pressure vessels 324, 326. In other embodiments, the manifold may include multiple tubes and/or may be located peripherally about the stack of dividers or in other positions. Air may enter and/or exit the pressure vessels 324, 326 through the ports 338, and can provide a conduit for fluid communication between pockets of air associated with each divider 334. In other embodiments, such as those in which dividers do not retain a pocket of air, the manifold may not be included.

The embodiment of FIG. 3A is one example of an arrangement of pressure vessels and an actuator that can be used within an air compression and storage system. It should be understood, that other arrangements are also possible and contemplated. By way of example, although the actuator is shown as including a single, double acting piston that is oriented vertically, other embodiments may include housings with actuators that include horizontally oriented pistons and/or multiple hydraulic pistons that operate in parallel and/or in series to move liquid within pressure vessels. According to some embodiments, actuators may lack pistons altogether, and instead comprise pumps that move liquid into and out of the pressure vessels. Multiple pumps and/or pistons can additionally or alternatively, be used in parallel to move liquid into and out of pressure vessels, according to some embodiments. Still, according to other embodiments, an actuator, such as a hydraulic piston, may have a direct mechanical connection to the motor/alternator of the system, as embodiments of the system are not limited to that shown in the figures.

The dividers 334 in the embodiment of FIG. 3A can increase the area of heat transfer surfaces that are in contact with air, including air/liquid interface areas and air/divider interface areas, at points during a compression and/or expansion according to the number of dividers and/or the surface area of the dividers. The heat transfer from the air and/or liquid to the dividers is also affected by the mass of the dividers, their thermal capacitance, and/or their thermal conductivity. As is to be appreciated, the air/liquid interface, absent the dividers, may be equal to the internal, horizontal cross-sectional area of the pressure vessel. Each of the dividers in the embodiment of FIG. 3A provides an air/liquid interface and/or an air/divider interface that is substantially equal in size to the cross-sectional area of the pressure vessel. In this respect, the total area of the air/liquid and/or the air/divider interface may be increased, at any given time during expansion or compression, by a multiple substantially equal to the number of dividers and/or the surface area of the dividers in the pressure vessel. Additionally, each of the dividers may provide an air/divider interface that is also substantially equal in size to the cross-sectional area of the pressure vessel. In this regard, pockets of air associated with each divider may be substantially surrounded with liquid, either in direct contact with the liquid or in indirect contact with the liquid through a surface of the divider, to increase area available for heat transfer with the liquid and the air. According to some embodiments, the number of dividers and/or the multiple by which the dividers increase the total area of the air/liquid interface and/or air/divider interface, at a particular time during compression and/or expansion, may be 5 or higher, 10 or higher, 20 or higher, 30 or higher, 40 or higher, or even 50 or higher. In other embodiments, the dividers will be more tightly packed, and may be spaced so that in all or a portion of the pressure vessel, the dividers are separated from each other by no more than 1 inch, ½ inch, ¼ inch, ⅛ inch, ¹⁄₁₆ inch, or some other number.

The dividers in the embodiment of FIG. 3A may, additionally or alternatively, maintain total heat transfer surface areas at high levels substantially throughout a compression and/or expansion cycle. The dividers may be placed closer together toward the top of the pressure vessel in order to accommodate the increased thermal loads toward the end of a compression event and at the beginning of an expansion event. As is to be appreciated, the total surface area available for heat transfer during a compression and/or expansion process may include the surface area of liquid and the divider that are in contact with the air throughout a complete compression and/or expansion cycle. That is, the total surface area for heat transfer may include the area that is in direct contact with the air (either areas of the liquid or the divider) integrated over the time of a compression and/or expansion cycle. In this respect, configuring dividers to maintain an increased heat transfer surface throughout a compression and/or expansion cycle may increase the total area available for heat transfer, when considered as a time integral over a complete compression and/or expansion cycle, by a multiple much greater than the number of dividers that are present in a pressure vessel.

Figure 3B:
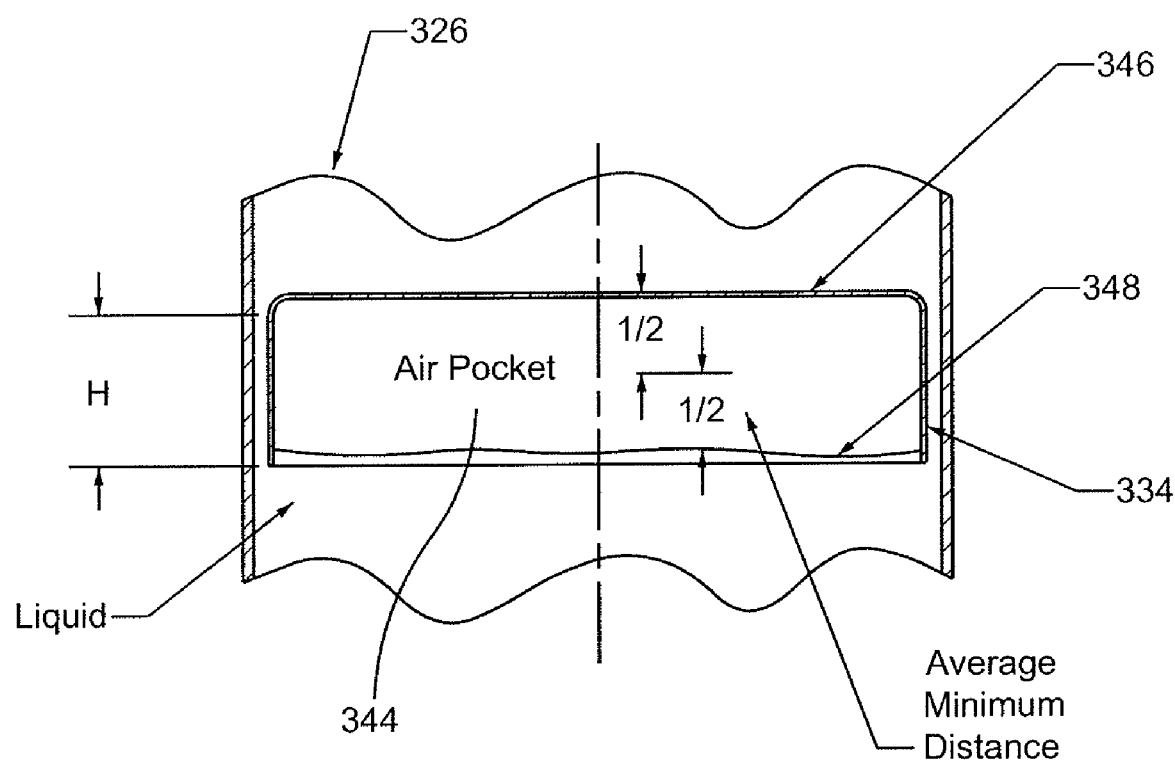
FIG. 3B is a cross-sectional view of one divider, taken along cross-section 3B-3B of FIG. 3A, and shows a schematic representation of average, minimum distance between points within the air of a pressure vessel and surfaces within the pressure vessel through which heat is to be transferred.

Dividers positioned inside a pressure vessel may additionally or alternatively reduce the average minimum distance between points of air that is to be compressed or expanded and the thermal conduction surfaces inside of a pressure vessel (either air/liquid interfaces or air/divider interfaces) through which heat is to be transferred. The dividers may also be textured, pocketed, stamped, coated, serrated, cut, bent, covered with a coating or layer of other material, or otherwise treated to increase or decrease their surface area, increase or decrease their ability to stay wet or hold water, to increase or decrease turbulence in the air or water, all to promote more effective heat transfer while minimizing irreversible energy losses. FIG. 3B shows a cross sectional view of a divider 334 that includes an air pocket 344, and the surfaces through which heat is to be transferred. As illustrated, the pocket 344 may be a relatively thin layer of air under or within a divider 334. Any point within the pocket 344 is no further away from either the upper wall 346 of the divider 344 (i.e., the air/divider interface) or the liquid that is present in the divider 334 (i.e., the air/liquid interface 348) than one half of the height H of the divider itself. In this respect, heat, when transferred in conduction, will only need to travel, at most, a distance equal to one half of the height H of the divider to reach one of the air/liquid interface or the air/divider interface. Similarly, when transferred in convective modes, air molecules may only need to travel, at most, a distance equal to one half of the height H of the divider to reach one of the air/liquid interface or the air/divider interface for heat transfer to occur.

Minimizing the distance between air in the pressure vessel and surfaces through or into which heat is to be transferred may substantially improve heat transfer to and/or from air that is compressed and/or expanded.

Air typically has the lowest thermal conductivity among the media through which heat is transferred in the compression/expansion device. By way of example, air has a thermal conductivity of about 0.024 Watts/meter-Kelvin while water has a thermal conductivity that is an order of magnitude greater that that of air (0.58 Watts/meter-Kelvin) and steel has thermal conductivity that is about three orders of magnitude greater than that of air (43 Watts/meter-Kelvin for 1% carbon steel). Reducing the distance that heat travels through air essentially reduces the greatest bottleneck to heat transfer by reducing the distance of the most thermally resistive element along the heat transfer path.

Dividers may be shaped differently than shown in the embodiment of FIG. 3A and/or may be packaged within pressure vessels in different arrangements. The dividers of FIGS. 3A and 3B are downwardly facing (and shaped substantially like inverted dishes), so as to form and trap air pockets therein.

Figure 4A:
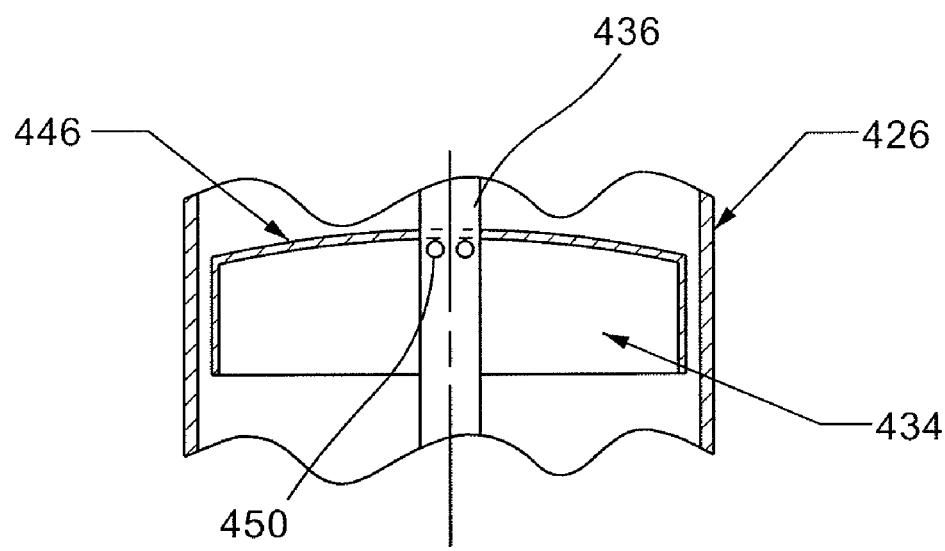
FIGS. 4A-4C show cross-sections of various configurations of dividers that may increase heat transfer surface areas within a pressure vessel.
Figure 4B:
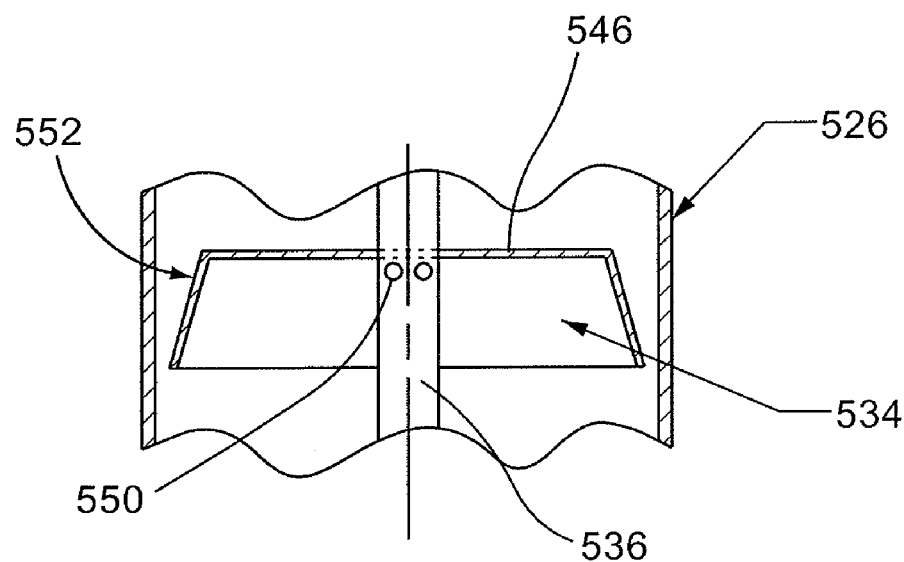

It is to be appreciated that other shapes are possible, such as dividers with domed upper walls, as shown in FIG. 4A, flared sidewalls as shown in FIG. 4B (either flared inwardly or outwardly), or other shapes, as embodiments are not limited to that which is shown in the figures. Additionally or alternatively, although the dividers of FIGS. 3A and 3B are sized to occupy an area substantially equal to a cross-sectional area of the pressure vessel, smaller dividers are also possible.

In the illustrated embodiments of FIGS. 4A and 4B, a divider 434 is disposed within a pressure vessel 426. The divider 434 includes a domed upper wall 446 and one or more passages 450 may be provided between each of the pockets created by the dividers 434 and a manifold 436 to allow the passage of air and/or liquid therebetween. It is also contemplated that fluid communication between the dividers 434 and manifold 436 may be provided by different means, such as by manifolds that are positioned external to a pressure vessel and/or manifolds that are positioned off-center within a pressure vessel.

FIG. 4B illustrates an embodiment that includes a divider 534 is disposed within a pressure vessel 526. The divider 534 includes an upper wall 546 and one or more passages 550 may be provided between each of the pockets created by the dividers 534 and a manifold 536 to allow the passage of air and/or liquid therebetween. The divider 534 also includes outwardly flared side-walls 552.

Figure 4C:
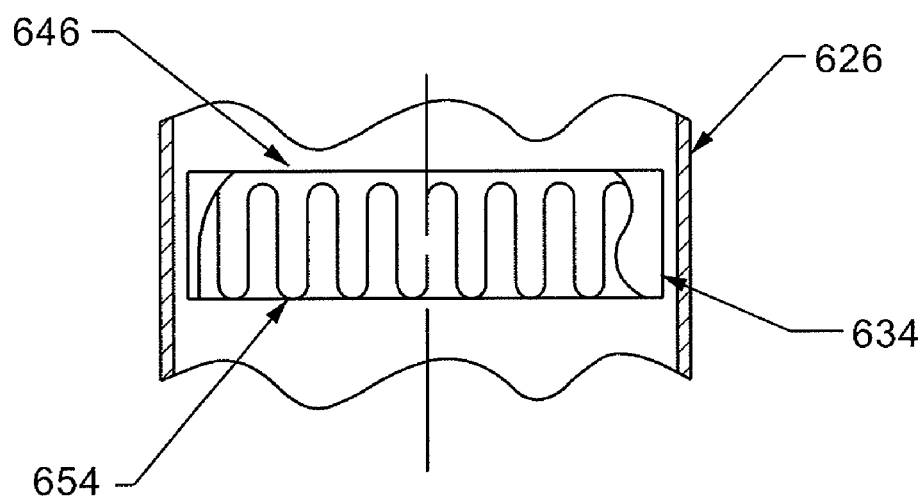

Dividers may be configured to create a turbulent air/liquid interface to further increase the heat exchange between the air and liquid of a divider of between air and surfaces of the divider itself. By way of example, according to some embodiments turbulators may be positioned on the interior of a divider to agitate liquid as the air/liquid interface moves upward or downward during compression and/or expansion modes, effectively increasing the air/liquid interface area and promoting convective heat transfer to and/or from air. According to other embodiments, such as shown in FIG. 4C, a divider 634 is shown disposed within a pressure vessel 626 and includes a bank of heat transfer fins 654 that may be incorporated onto surfaces of the divider 634 to promote heat transfer between an air pocket of a divider and the surfaces (e.g., upper wall 646) of the divider. It is to be appreciated, however, that not all embodiments include turbulators or banks of fins, as the various embodiments are not limited to that shown or explicitly described herein.

As mentioned above, the size and shape of a pressure vessel may be optimized for considerations other than the air/liquid interface area when a plurality of dividers are used to define the air/liquid interface. By way of example, according to some embodiments, dividers may allow the total area of the air/liquid interface to be maximized while the overall size of the pressure vessel is designed to have a maximum outside dimension (i.e., the greatest of the length, width, and height of a pressure vessel) below a particular distance, which may prove useful when pressure vessels are to be packaged for shipment either separately or in an ISO standard shipping container. Additionally or alternatively, pressure vessels may be shaped to provide for optimal structural integrity, having cylindrical, spherical/cylindrical, or other shapes. According to some embodiments, the maximum dimension of a cylindrical pressure vessel with a rounded top and bottom structure may be about 6 meters while having a total air/liquid surface area of about 140 square meters, a maximum dimension of about 2.5 square meters and a total air/liquid surface area of about 40 square meters, or a maximum dimension of about 2 meters and a total air/liquid surface area of about 10 square meters.

As discussed above, heat can be transferred from and/or to air that is compressed and/or expanded by liquid (e.g., water) within a pressure vessel. An air/liquid or air/divider interface (e.g., provided in part by dividers discussed above) may move and/or change shape during a compression and/or expansion process in a pressure vessel. This movement and/or shape change may provide a compressor/expander device with a heat transfer surface that can accommodate the changing shape of the internal areas of a pressure vessel through which heat is transferred during compression and/or expansion. In some embodiments, the liquid may allow the volume of air remaining in a pressure vessel after compression to be nearly eliminated or completely eliminated (i.e., zero clearance volume).

Figure 5A:
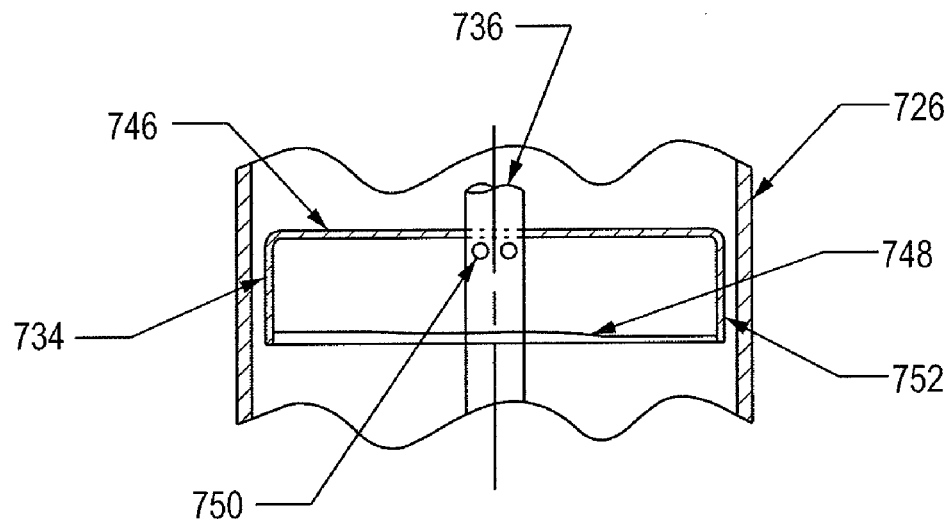
FIGS. 5A-5C show the air/liquid interface in different stages of a compression or expansion cycle, according to one embodiment.
Figure 5B:
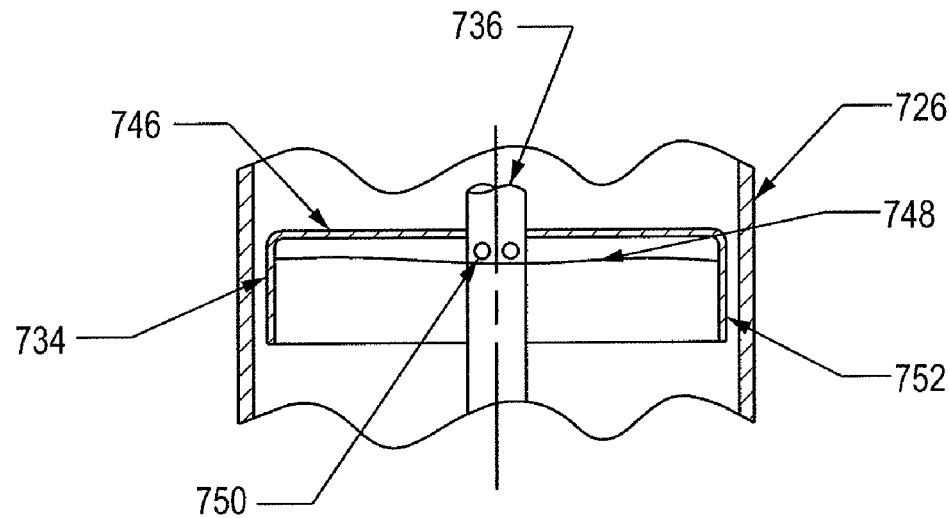
Figure 5C:
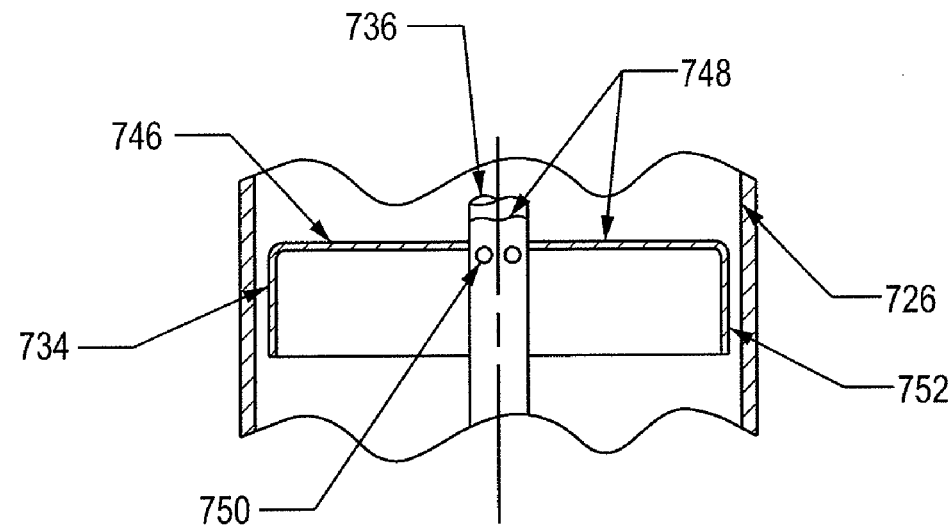

FIGS. 5A-5C show the air/liquid interface associated with a divider 734 at various stages of compression and expansion. At the beginning of a compression cycle, an air pocket is present inside of the divider 734 with the air/liquid interface 748 just above the lower edge of the divider side wall 752, as shown in FIG. 5A. As additional liquid is introduced into the volume of the pressure vessel, the air/liquid interface 748 moves upward as the additional liquid drives the air/liquid interface 748 toward the divider upper wall 746 and compresses air within the volume of the pressure vessel 726. The process continues until the air/liquid interface 748 eventually reaches the passages 750 between the divider 734 and manifold 736, and liquid begins to enter the manifold 736 itself, as shown in FIG. 5B. Eventually, near the end of the compression cycle, the air/liquid interface 748 may contact the upper wall 746 of the divider 734, as shown in FIG. 5C, and nearly or completely fill the manifold 736.

According to some embodiments, the area of the air/liquid interface of a divider may remain substantially constant, at least until the air/liquid interface reaches the top of the upper wall, due to a substantially constant cross-sectional area between sidewalls of a divider, although there may be some insubstantial change in air/liquid interface area due to flaring and/or a reduction in area of air-exposed side wall as the air/liquid interface moves higher within a pocket of air. A relatively constant, relatively high air/liquid interface area throughout the compression process may help promote heat transfer from the air throughout the compression process.

According to some embodiments, features may be included in a compressor/expander device to balance the flow of air and/or liquid between a manifold and pockets of air under the dividers of a pressure vessel. The flow may be balanced such that the air/liquid interface of each of the dividers of a pressure vessel, or some portion of the dividers of a pressure vessel, may move within dividers synchronously, such as to reach upper walls of the dividers at a common time. In this respect, areas for heat transfer between air at the air/liquid interface and at the air/divider interface may be maintained in each of the dividers throughout a compression and/or expansion process. In some embodiments, ports between the manifold and each of the dividers may be sized differently to accomplish balanced flow. Additionally and/or alternatively, ports between the manifold and dividers may include valves to provide balanced flow. The ports and/or valves may be configured to account for the gravitationally induced pressure gradient in the pressure vessel. For example, the ports near the bottom of the pressure vessel may be sized smaller than the ports near the top of the pressure vessel in order to accommodate the higher pressures expected at the bottom of the pressure vessel.

During an expansion mode, the air/liquid interface moves in the dividers of a pressure vessel essentially in the opposite direction as during compression. For instance, the expansion process may begin with the pressure vessel, including the manifold and dividers, entirely or substantially filled with liquid. Air forced into the port of the pressure vessel may move liquid downwardly through the manifold, as shown in FIG. 5C, eventually passing through the passages and entering each of the dividers, creating pockets of air and air/liquid interfaces therein. As air continues to expand into the volume, the air/liquid interface of each divider may move lower, as shown in FIG. 5B, eventually reaching a level just above the lower edge of the dividers, as shown in FIG. 5A. Any air/liquid interface that happens to pass below the lower end of a divider side wall may cause air to pass between the inner pressure vessel walls and the outer walls of the dividers. This air may eventually reach the top of the pressure vessel and re-enter the manifold through passages near the top of the pressure vessel or through another mechanism included for this purpose. In another embodiment, air forced into the port of the pressure vessel may move liquid downwardly past the dividers, without creating pockets of air. In this configuration, the pressure vessel holds only one pocket of air, and the air volume grows larger during the expansion process until the expansion stroke is concluded.

Similar to compression, the overall air/liquid interface area may remain substantially constant throughout the expansion process, at least after moving away from the upper surface of each divider and before the air/liquid interface moves below the lower edge of any divider. In other configurations, the air/divider interface will increase linearly or geometrically through the expansion process.

Using liquid in a pressure vessel to compress and displace air may provide several benefits. According to some embodiments, the liquid may act as a water piston that conforms to the shape of a pressure vessel when used to compress and displace air therefrom. According to some embodiments, the water piston may essentially occupy the entire volume of the pressure vessel, thus eliminating any clearance volume. Using water as the positive displacement mechanism also provides a heat management mechanism, thus serving multiple purposes. Additionally and/or alternatively, in some embodiments, excess liquid may be introduced to the pressure vessel as liquid condenses out of air that is compressed. Condensed liquid may be combined with liquid that resides in the pressure vessel without adverse effects. It is possible, according to some embodiments, that enough liquid may condense to cause the total volume of liquid to exceed the volume available in a pressure vessel at some points during the operating cycle of a compressor/expander device. In such scenarios, excess liquid may exit the pressure vessel through the port or through another mechanism included for this purpose, without adverse effect, along with air that is being compressed and displaced. Excess liquid may be removed through moisture traps, or by means known to those of skill in the art. Any liquid deposited into the pressure vessel during compression is removed and retained at minimal loss, using an intermediate reservoir, to a holding tank. During expansion, liquid can be vaporized, thereby removing liquid from the pressure vessel. Liquid held in the holding tank can be re-injected during expansion so as to maintain the total liquid volume in the system constant. In this manner the compression/expansion system does not consume any liquid.

Using water as the positive displacement mechanism also provides a near zero friction piston seal, and a zero leakage piston seal, which reduces energy losses due to friction, reduces maintenance and inefficiency due to seal wear, eliminates the need to replace the piston seal, improving device and process reliability. It also eliminates the need to lubricate the piston on the cylinder or to maintain, service, and replace the lubricant or its filter and/or filtering system, or to cool the lubricant, and to avoid the energy losses associated with pumping, filtering, and cooling the lubricant.

Figure 6:
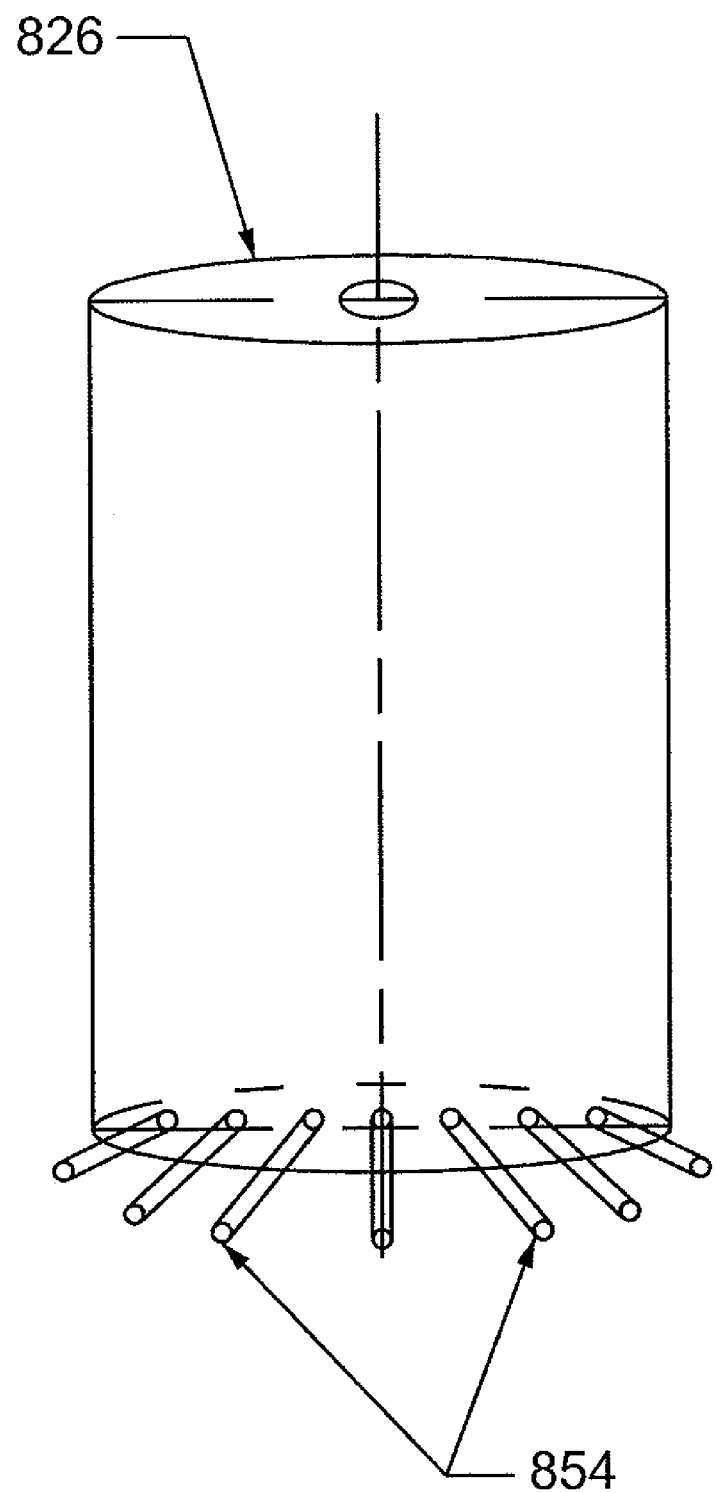
FIG. 6 shows a vessel with a heat exchanger that may be used to transfer heat to or from the liquid of a pressure vessel, according to one embodiment.

Liquid within a pressure vessel, according to some embodiments, may also act in combination with a heat exchanger to transfer heat from air that is compressed (or to air that is expanded) to an external environment (or from an external environment). By way of example, FIG. 6 shows a heat exchanger 854 that extends through a wall of the pressure vessel 826 to contact both the liquid and the external environment. As illustrated, the heat exchanger may include a circular array of heat pipes, although other types of heat exchangers may be used, additionally or alternatively. As is to be appreciated, heat pipes operate with a refrigerant that evaporates at one end of the pipe where heat is received, and that condenses at the other end of the pipe where heat is removed, approximately at the same temperature as that which heat is received, or within a small range of temperatures, such as ranges of about 4° C. It is to be appreciated that FIG. 6 shows but one heat pipe arrangement that may be used to transfer heat to or from liquid of a pressure vessel, and that other arrangements may also exist, such as arrangements that include heat pipes or other types of heat exchanges positioned in actuator housings or other components that are in fluid communication with a pressure vessel. According to another embodiment, heat pipes may be provided in direct contact with the dividers, some of which may trap air pockets within a pressure vessel. It is also to be appreciated that any heat source or heat sink may be used in the environment external to the pressure vessel to provide or receive heat therefrom, as embodiments of the system are not limited to any one arrangement of heat sources or heat sinks.

The use of a liquid as a medium through which heat passes during compression and/or expansion may allow for a continuous cooling process. That is, during compression the liquid may receive heat from air that is being compressed, and pass this heat to the external environment continuously, both while air is being compressed and while air is being received by the pressure vessel for later compression. Similarly, heat addition may occur when a compressor/expander device is operating in an expansion mode both during expansion and as expanded air is passed from a pressure vessel.

According to some embodiments, the liquid in the compressor/expander device may include water, although other liquids may be used, additionally or alternatively. As is to be appreciated, water may naturally condense out of air that is being compressed by the system, and in this respect, may combine with the liquid without adverse impact. Additionally, when used in embodiments of the expander/compressor device, water may evaporate into air during expansion without having an adverse impact. Other types of liquids, however, may be used in addition to or in place of water. Some examples of such liquids may include additives or entire liquids formulated to prevent freezing, such as glycol, liquids that prevent evaporation, such as glycerin, liquids to prevent corrosion, liquids to control viscosity, liquids to control thermal conductivity, liquids to control lubricity, liquids to prevent biological agents from growing, liquids to adhere to surfaces of the pressure vessel, liquids to enhance the operation of the valves in the system, liquids to handle the build-up of any minerals such as salt from a salt cavern, and/or liquids to prevent foaming.

One embodiment may use a phase change material as the compression/expansion medium directly in the pressure chamber. In this way, the liquid not only provides the surface with which air is compressed, but also serves as a heat transfer mechanism. A liquid undergoing a phase change (whether to or from gas or solid phases) remains at constant temperature. This can be taken advantage of within the pressure vessel to keep the expansion or compression temperature isothermal by direct means, without requiring a heat exchange device. Heat transfer occurs by direct contact between the air and phase change liquid. This heat transfer mechanism can be implemented in a variety of techniques apparent to the artisan, including contacting the air with a spray or mist of the working liquid (such as water), using a working liquid that boils at a suitable temperature and the vapor phase of which can be readily separated from the air after compression and before storage (e.g. by condensation), and/or using working liquid that freezes at a suitable temperature (e.g. by operating the system at conditions in which the working liquid is a mixture of the liquid and its solid form, such as a water ice slush).

Compressor/expander devices may be arranged in series to create a multi-stage compressor/expander device, according to some illustrative embodiments. FIGS. 7A-7I illustrate an example of a multi-stage compressor/expander device including three-stages. Each of the first, second, and third stages comprise a pair of pressure vessels, similar to the pressure vessels described with respect to FIG. 3A, connected in fluid communication to an actuator. In other configurations, there could be one, three, four, or more pressure vessels in each stage. Specifically, an actuator for the first stage includes a housing or conduit 940 disposed between a first pressure vessel 926 and a second pressure vessel 928, an actuator for the second stage includes a housing 940' disposed between a first pressure vessel 926' and a second pressure vessel 928', and an actuator 940" for the third stage includes a housing 940" disposed between a first pressure vessel 926" and a second pressure vessel 928". A piston 932, 932', 932" is movably disposed within the housing 940, housing 940' and housing 940", respectively. Multiple dividers 934 are disposed within each of the first pressure vessel 926 and the second pressure vessel 928 of the first stage, multiple dividers 934' are disposed within each of the first pressure vessel 926' and the second pressure vessel 928' of the second stage, and multiple dividers 934" are disposed within each of the first pressure vessel 926" and the second pressure vessel 928" of the third stage, as shown, for example, in FIGS. 7B-7I.

The first and second pressure vessels 926 and 928, respectively, of the first stage each include a first valve 956 that opens to allow the receipt of air from the environment. These valves, and those referenced below, may be actively controlled, passively controlled, or may be an active or passive port. Each of the first and second pressure vessels 926, 928 of the first stage is also fluidly coupled to a pressure vessel (926', 928') of the second stage by a conduit 958, 960 that may include one or more second valves 962 to selectively open and close fluid communication between the volumes of the corresponding pressure vessels. The pressure vessels 926', 928' of the second stage are also fluidly coupled to pressure vessels 926", 928" of the third stage through conduits 964, 966, and include one or more third valves 968, 968' that selectively open and close fluid communication therebetween. Fourth valves 970 are additionally placed downstream to the ports of pressure vessels 926", 928" at the third stage to control the passage of air between the third stage and a storage structure (not shown) to or from which pressurized air is passed. It is to be appreciated that, although described herein as a three-stage compressor/expander device, fewer or additional pressure vessels and/or valves can be included to create fewer or additional stages of compression/expansion.

According to one illustrative embodiment, constructed similarly to that shown in FIG. 7A, the first stage may be configured to provide a compression ratio of about 10.14:1, the second stage has a compression ratio of about 5.5:1, and the third stage of has a compression ratio of about 3.3:1. Such compression ratios may be suitable for a system that is configured to compress air to a pressure of about 184 atmospheres from a starting pressure of about atmospheric pressure, and to expand air from 184 atmospheres to about atmospheric pressure. A compressor/expander device configured in this manner may have a power rating of about 2 megawatts, according to one embodiment. In another embodiment, the stages may have roughly equivalent pressure ratios of around 5, 6, 7, or some other number. In another embodiment, a separate compression and/or expansion device or process such as a screw compressor and/or expander, centrifugal compressor and/or expander, bellows compressor and/or expander, piston compressor and/or expander, or other compressor and/or expander device or process may provide compression and/or expansion for the first stage, the second stage, the third stage, or some combination of stages, at a pressure ratio of 2:1, 3:1, 4:1, 5:1, 6:1, or some other number.

Figure 7B:
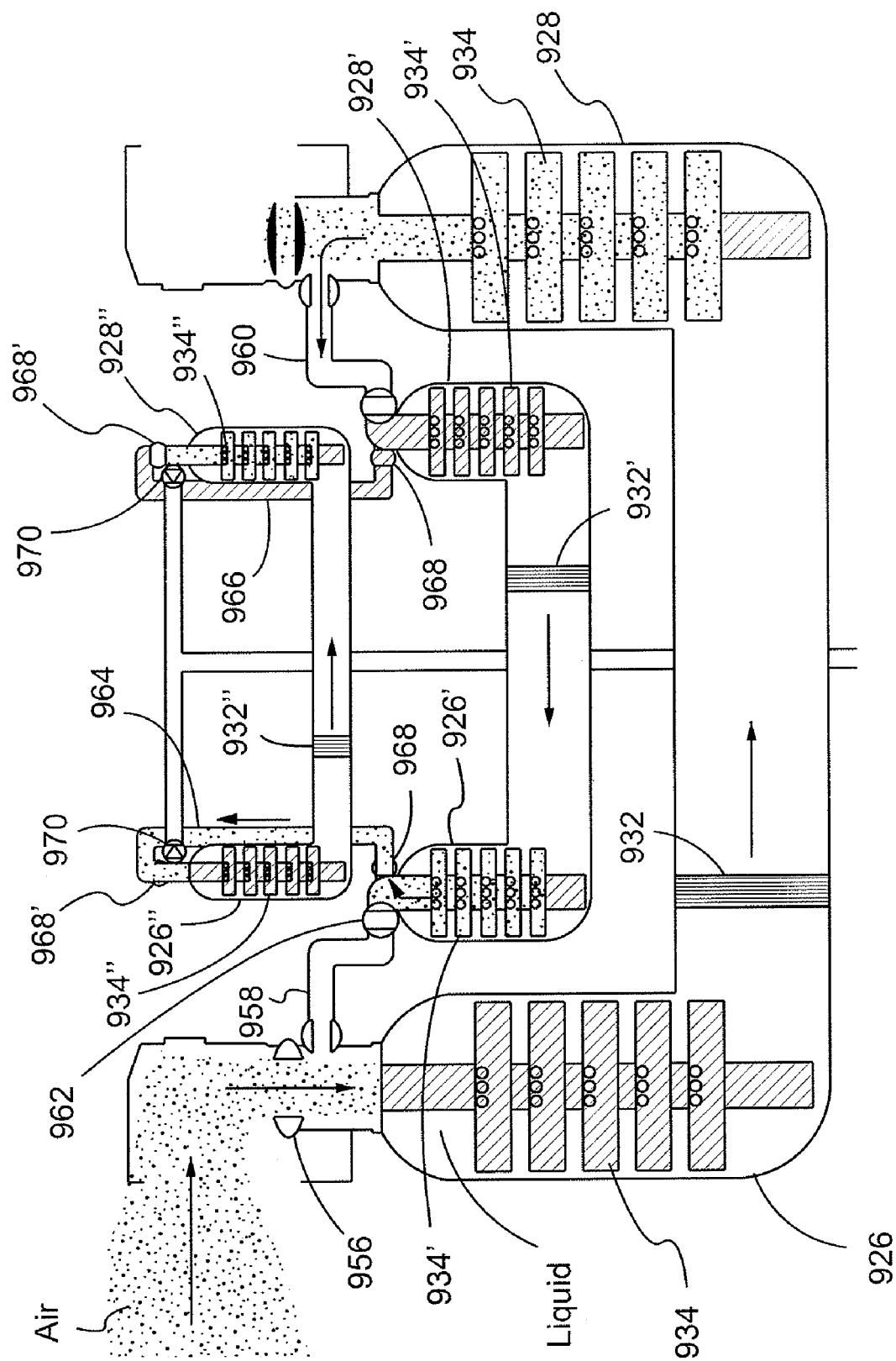
Figure 7C:
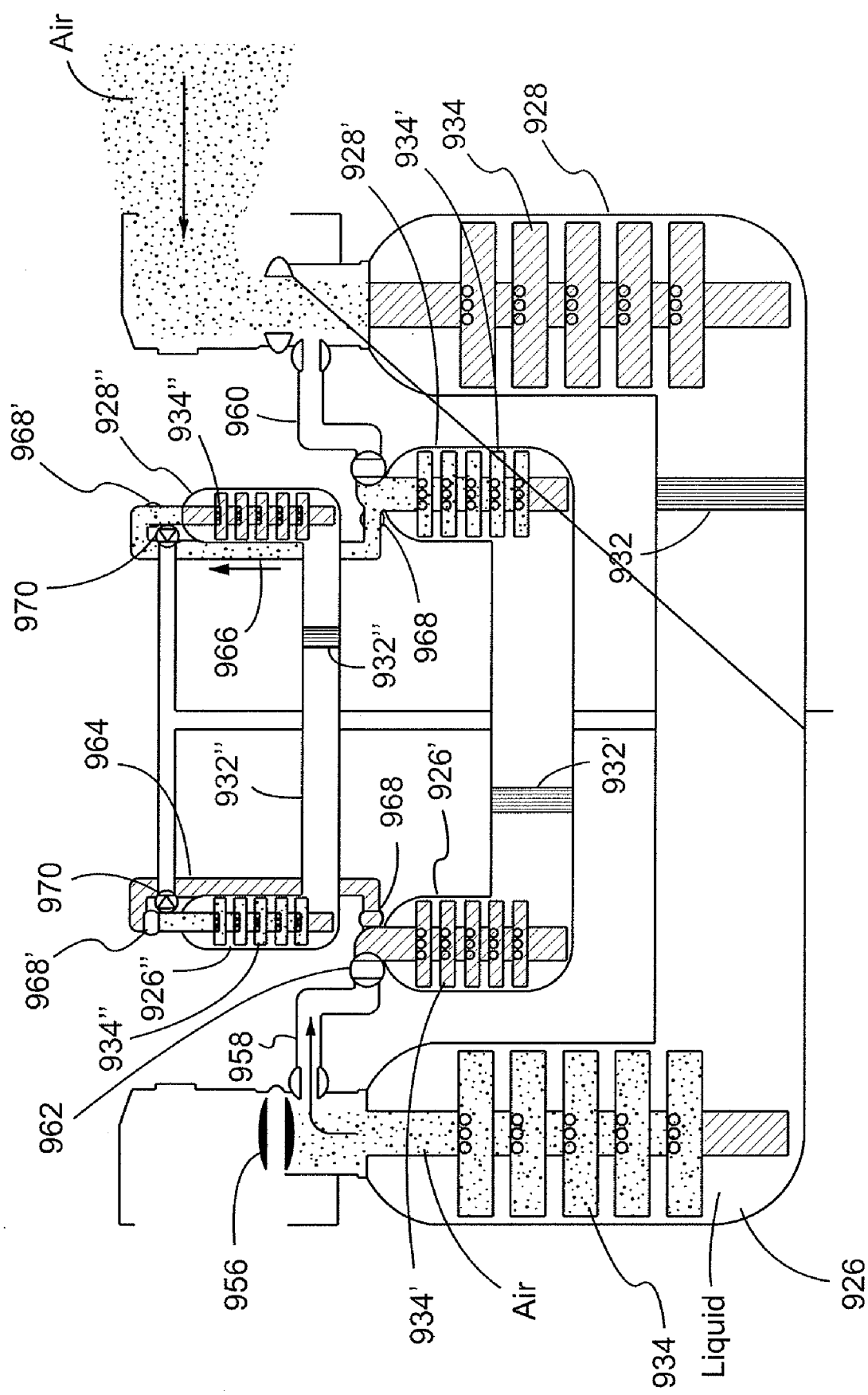
Figure 7D:
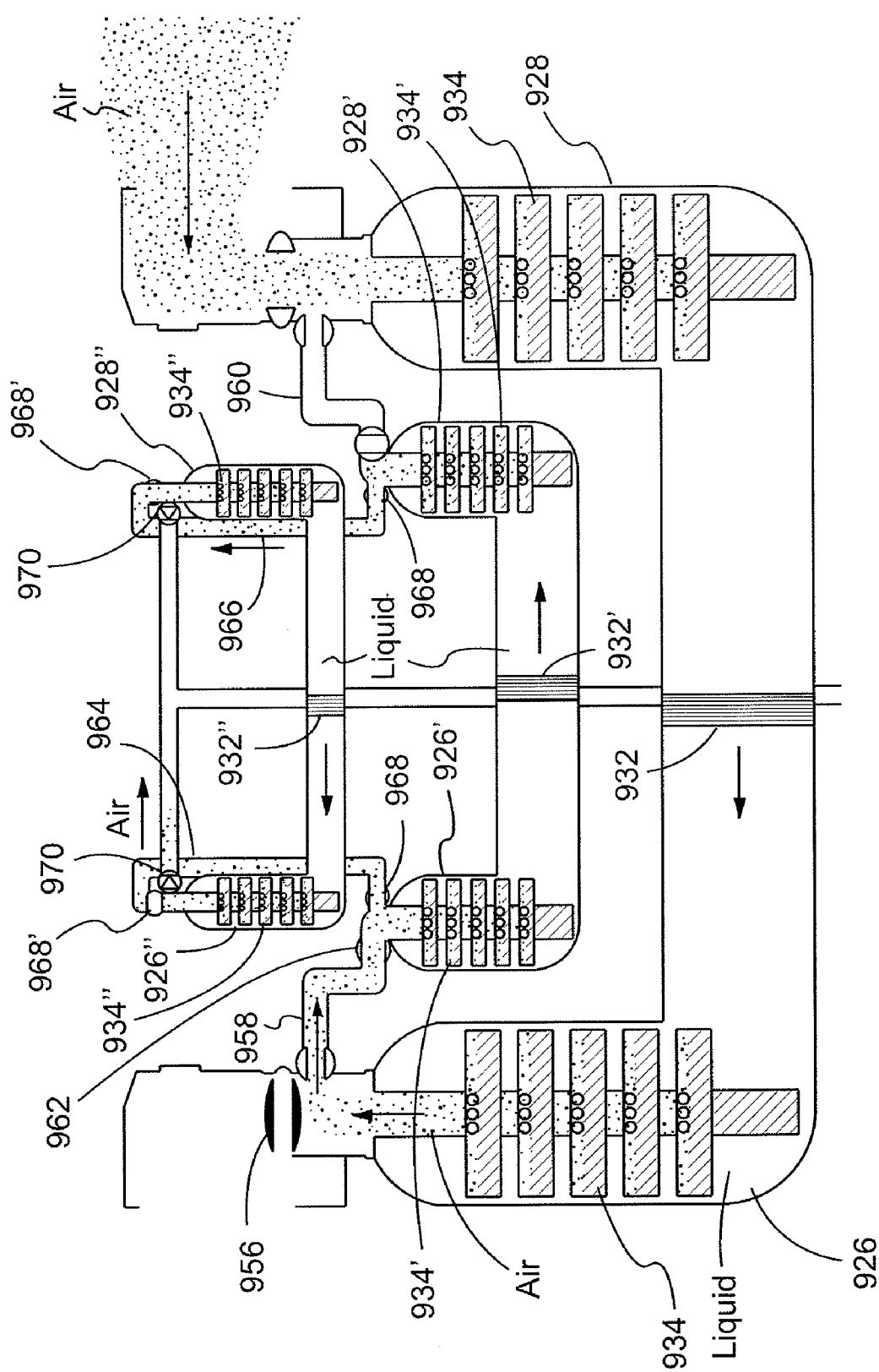

In the embodiment of FIG. 7A, a compression cycle may begin with the piston 932 of the actuator for the first stage moving away from the first pressure vessel 926 of the first stage to increase the volume available for air inside of the first pressure vessel 926 of the first stage, as represented by FIG. 7B. This movement may pull water out of the dividers 934 of the first pressure vessel 926, creating negative pressure that draws ambient air into the first pressure vessel 926 into pockets within each of the dividers 934, creating additional air/liquid and air/divider interfaces through which heat may be transferred. In another embodiment, this movement may pull water out of the dividers 934 of the first pressure vessel 926, creating negative pressure that draws ambient air into the first pressure vessel 926 into and through or past the dividers 934, creating additional air/liquid and air/divider interfaces through which heat may be transferred. When the piston 932 reaches the end of this stroke, the first valve 956 between the atmosphere and the first pressure vessel 926 is closed and the second valve 962 between the first stage and second stage is opened, as shown in FIG. 7C. The compression stroke begins as the piston 932 returns toward the first pressure vessel 926, decreasing the volume available for air in the combined volume of the first pressure vessel 926 of the first stage and the first pressure vessel 926' of the second stage, compressing and displacing the air toward the first pressure vessel 926' of the second stage, as shown in FIG. 7D. In this respect, compression of air may take place across pressure vessels of different stages. As the piston 932 of the first stage nears the end of its stroke toward the first pressure vessel 926, the piston 932' of the second stage nears the end of its stroke away from the first pressure vessel 926' of the second stage and the second valve 956 between the first pressure vessel 926 of the first stage and the first pressure vessel 926' of the second stage closes, as shown in FIG. 7E. Operation between the second and third stages of the compressor/expander device mirrors the above described operation between the first and second stages. Operation between the third stage and the storage structure, however, may differ in that the valve (e.g., valve 970) to the storage structure may open when the pressure at the third stage exceeds the pressure of air in the storage structure, rather than when the piston of the third stage begins its compression stroke.

The above described compression cycle differs from existing positive displacement compression cycles, in that the compression in the pressure vessels includes the air volume of pressure vessels of multiple stages, rather than that of a single stage. In contrast, prior art compressors typically compress air in a single compression chamber (i.e., pressure vessel). It is to be appreciated other embodiments could be implemented with any number of pressure vessels at a common stage, or spread among multiple stages, as the various embodiments are not limited to that described herein. Additionally, in embodiments where compression occurs across pressure vessels of different stages, volumetric ratios of any stage may be modified by adjusting valve timing between various stages.

Figure 7F:
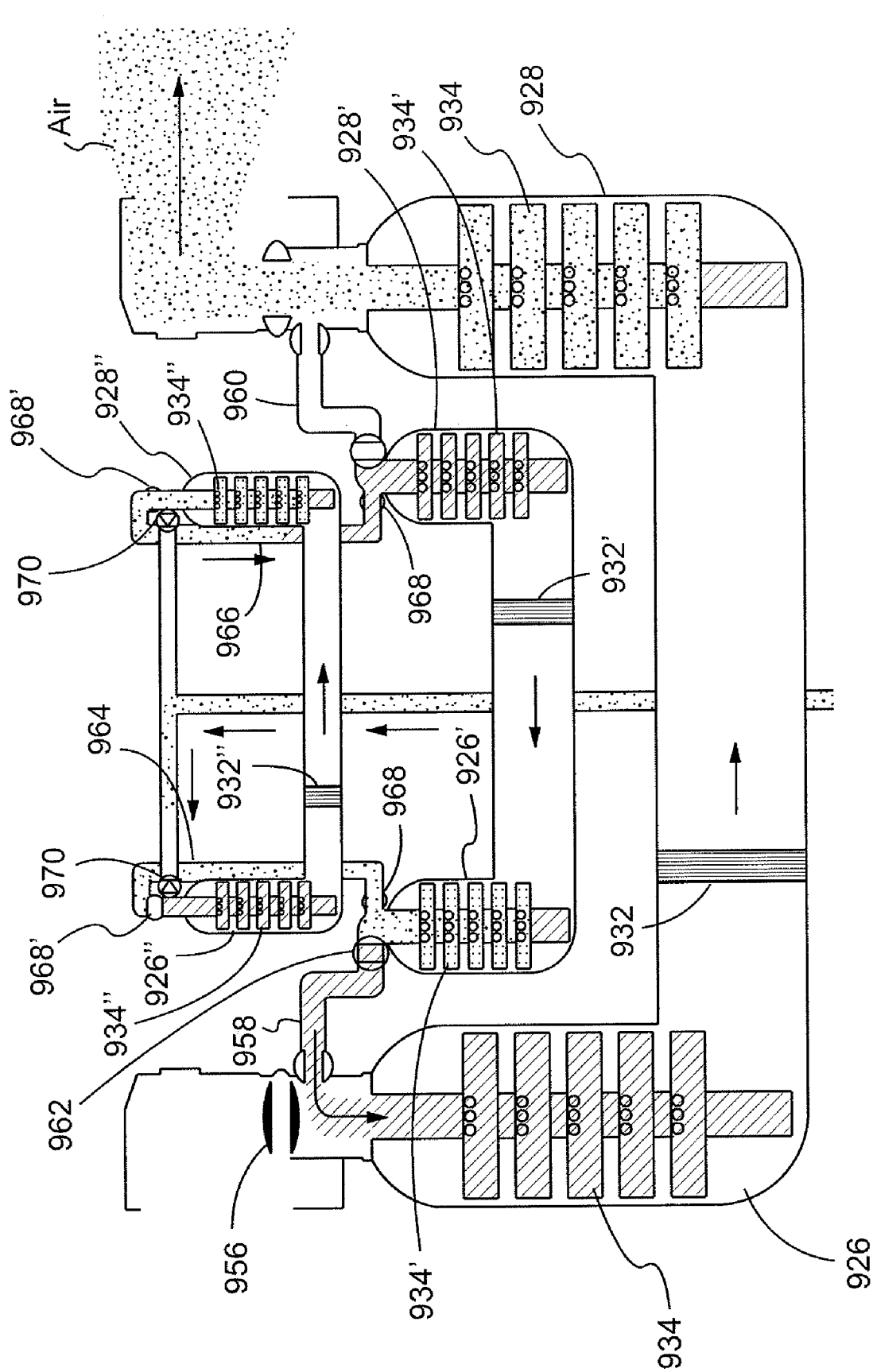
Figure 7G:
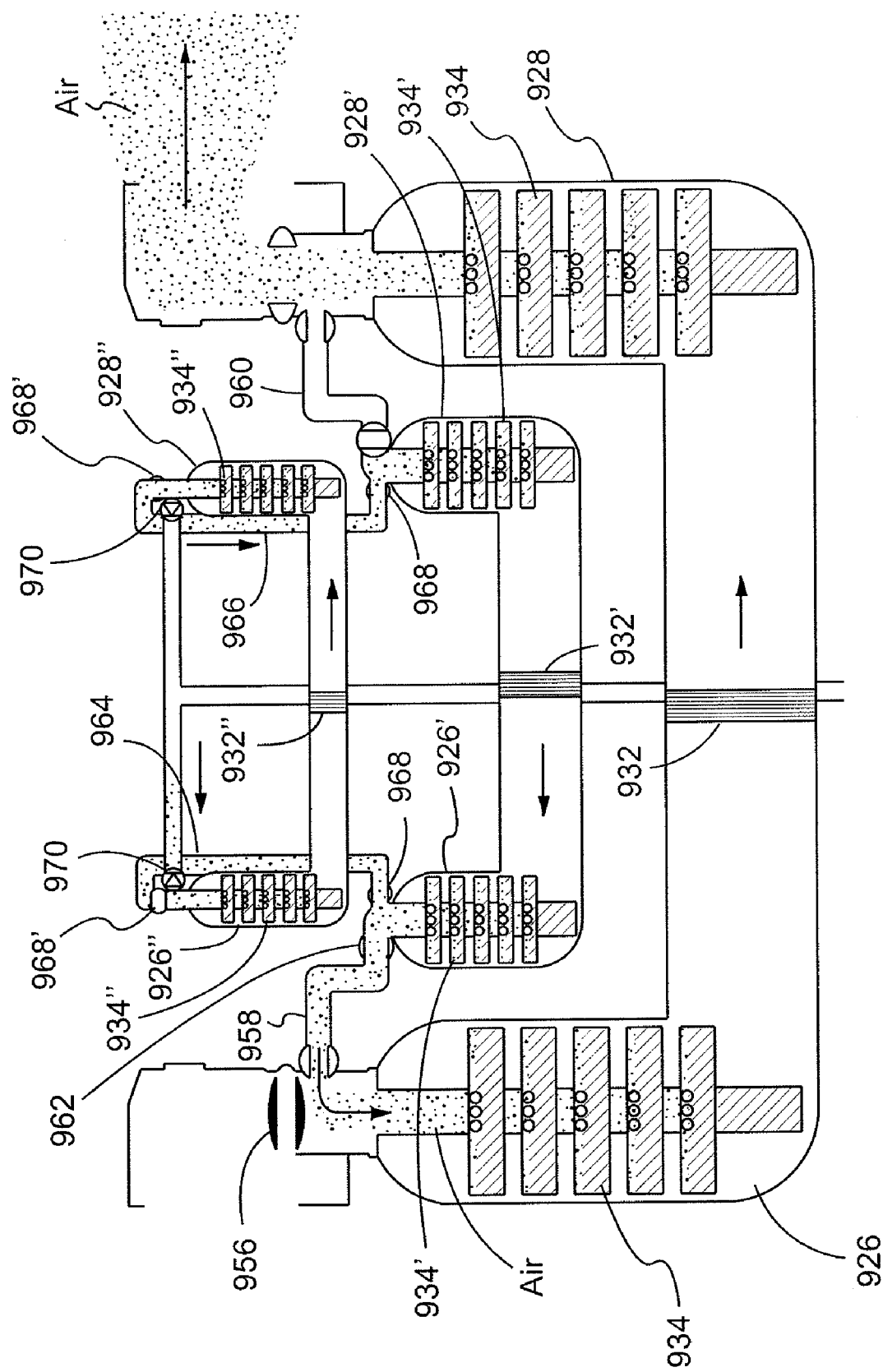
Figure 7H:
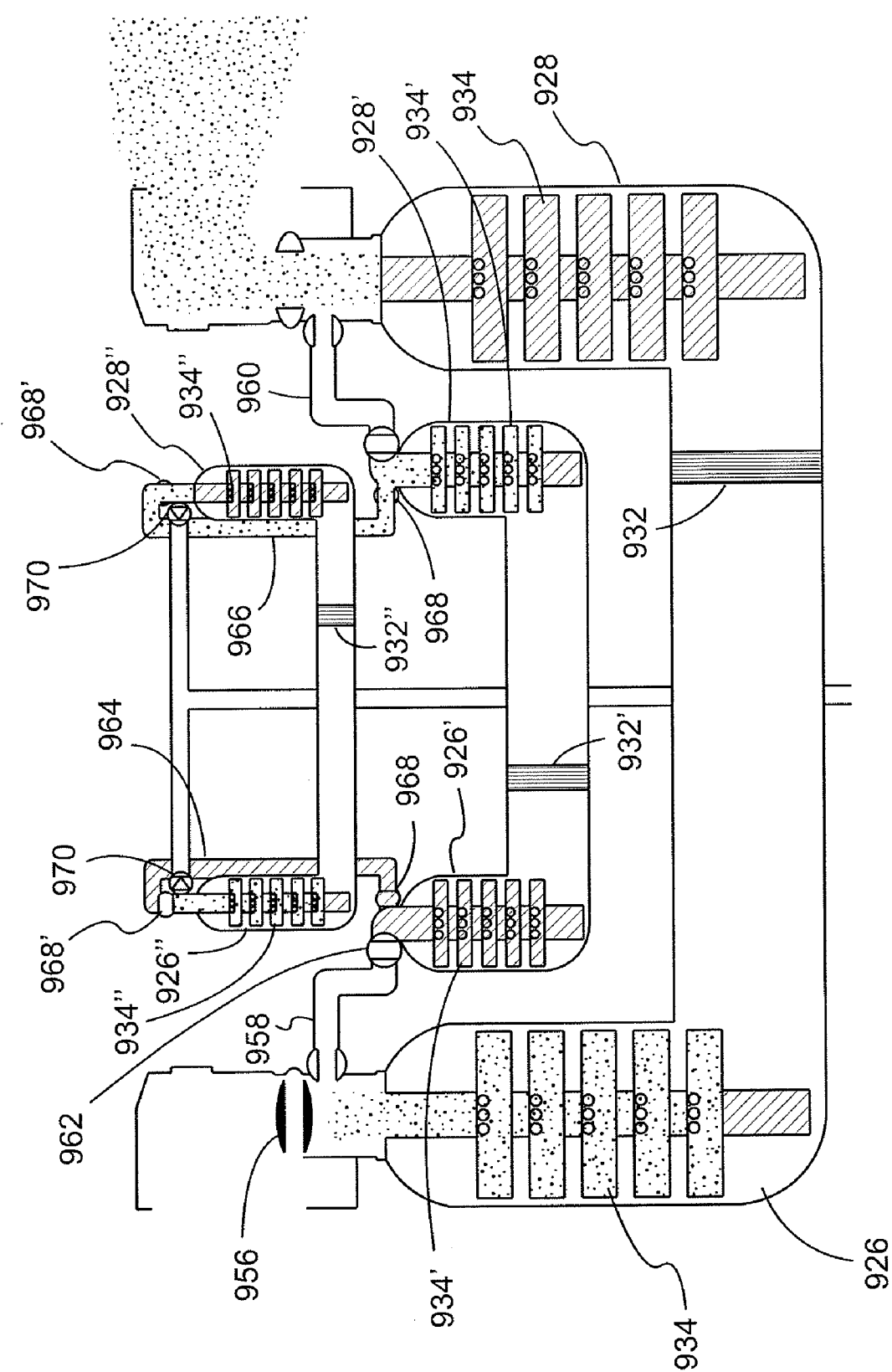
Figure 71:
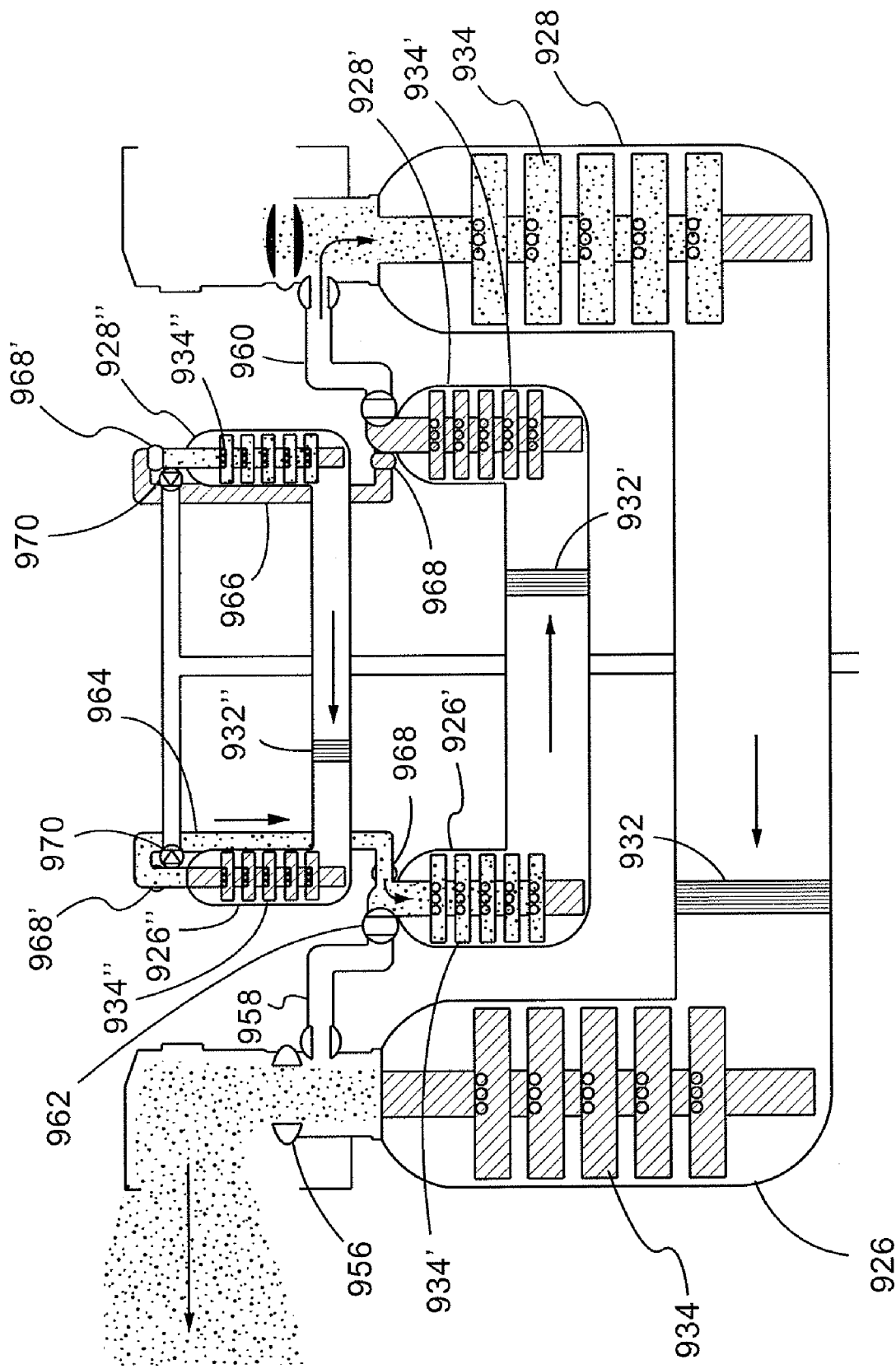

An expansion cycle, in an embodiment constructed like that of FIG. 7A, is represented in FIGS. 7F-7I. Expansion begins with air expanding into a first pressure vessel 926" of the third stage from a storage structure (not shown), as represented in FIG. 7F. This expanding air moves liquid to drive the third actuator (e.g. piston 932") away from the first pressure vessel 926" of the third stage. This process continues, with the third valve 968' to the first pressure vessel 926' of the second stage closed, as shown in FIG. 7G. As the third piston 932" nears the end of travel away from the first pressure vessel 926" of the third stage, as shown in FIG. 7H, the fourth valve 970 closes fluid communication with the cavern (e.g., storage structure). The third valve 968' is then opened to allow the air to expand into the first pressure vessel 926' of the second stage, driving the second actuator (e.g., piston 932'), as shown in FIG. 7I. Operation between the third and second stages, and then the second and first stage of the compressor/expander device mirrors the above-described operation between the storage structure and the third stage.

Compressor/expander devices may be installed modularly, allowing systems to be constructed for a wide range of energy storage needs. By way of example, a compressor/expander device, such as the device of FIG. 7A, may be sized to store and generate between 1.0 and 5.0 megawatts of power, although it is to be appreciated, that other embodiments may include higher or lower power ratings. A plurality of compressor/expander devices may be installed together and operated in parallel for installations having higher energy storage power requirements, for instance as high as 300 megawatts or higher, according to some embodiments. Installations that include multiple compressor/expander devices, arranged in parallel, may operate at less than full capacity by shutting down a portion of the compressor/expander devices, or by operating some or all of the compression/expansion devices at less than their full power capacity, which may promote efficient system operation. Installations that include multiple compressor/expander devices, arranged in parallel, may operate at more than full rated capacity for some duration in order to meet a particular operating requirement, such as compressing air when power prices are low or negative, or expanding air when power prices are high. Such operations may be affected by increasing the speed of the compression stroke, increasing the mass of air in the intake of the third stage from the storage vessel by controlling the timing of the valves in the system, particularly the valve(s) between the storage vessel and the third stage. Additionally or alternatively, installations that include multiple compressor/expander devices may be constructed modularly to allow system operation before all compressor/expanders are installed, or during periods of time when one or more compressor/expanders are down for maintenance, repair, replacement, or for other reasons. Additionally or alternatively, installations that include multiple compressor/expander devices may be constructed modularly to allow more compressors/expanders (the spares) to be constructed than called for by the power rating of the project, allowing the spares to take over just as or shortly after various compressor/expander units are turned off for maintenance, repair, replacement, or other reasons, thereby maintaining a higher power rating for the power plant.

Embodiments of the compressor/expander device can accommodate a wide range of operating power levels. As is to be appreciated, it may be desirable to store or release energy at varying rates, particularly when energy to be stored is received from a less predictable source, such as a wind farm. A compressor/expander device described herein can act as a positive displacement device, meaning that the overall device intakes a common volume of air during each cycle, although each stage compresses this initial volume to different values. Such positive displacement devices may operate at different power levels by compressing (or expanding) different masses of air that have a common volume, unlike centrifugal compressors typically used in CAES systems that operate efficiently primarily at a relative narrow range of power levels. Additionally or alternatively, installations having a plurality of compressor/expander devices that operate in parallel may activate only a portion of the installed compressor/expander devices to accommodate different operating power levels.

The compressor/expander devices may operate at relatively slow speeds, which may provide for improved heat transfer, improved energy consumption and/or generation, improved durability, decreased entropy losses, decreased pressure drops through valves, pipes, and ports, decreased thermal cycling of the compressor/expander, and/or improved reliability. According to some embodiments, a compression or expansion cycle of the compressor/expander device may allow for improved heat transfer, which may allow the device to achieve near isothermal behavior during expansion and/or compression. Additionally, lower temperatures associated with improved heat transfer and less friction at joints and sliding contacts in the expander/compressor device may provide for improved durability and reliability, as compared to higher speed machinery.

Slower operating speeds and/or increased heat transfer capacities of various embodiments of the compressor/expander device enable heat transfer to occur with the external environment across relatively low temperature differences. According to some embodiments, the expander/compressor device may operate with near isothermal compression/expansion processes while exchanging heat with the external environment across temperature differences as low as 50° C., as low as 25° C., or even as low as 5° C.

According to some embodiments, low-grade heat sources and/or heat sinks may be used to provide heat to and receive heat from the compressor/expander during expansion/compression modes. In this respect, the system may be capable of operating without burning fossil fuels, such as for heating air at expansion. It is to be appreciated, however, that embodiments of the system may also be operated in conjunction with power plants or other systems that do burn fossil fuels. Some embodiments may use geothermal energy, solar energy, and other energy inputs, water, salt water, gravel, water and gravel, salt water and gravel, and other thermal heat sinks and sources as heat sources and/or sinks, taking advantage of the substantially constant ground temperatures that exist 4 to 10 meters below the earth's surface and substantially constant temperatures associated with subterranean caverns, when used as storage structures. Additionally, according to some embodiments, compression may occur at night when the air temperature is lower and may provide an environment to which heat is removed while expansion occurs during the day when temperatures are higher and may provide a source of heat used in the expansion process.

Figure 8:
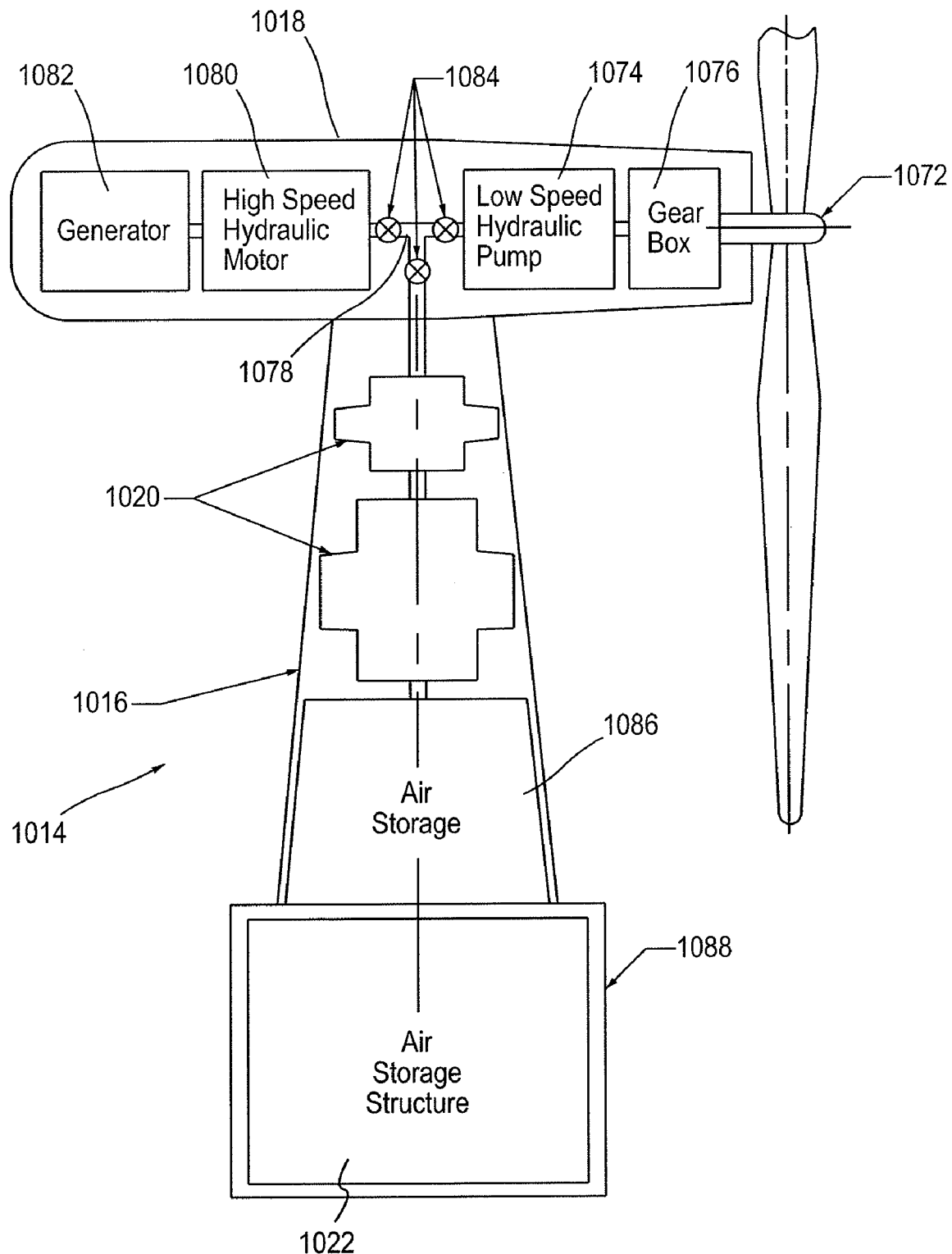
FIG. 8 shows a compressed air storage system incorporated into a wind turbine, according to one embodiment.

According to some embodiments, a system that utilizes a compressor/expander device may have a modular construction. By way of example, FIG. 8 shows one embodiment of a compressor/expander device 1020 that is incorporated directly into the structure of a wind turbine 1014. The wind turbine 1004 includes a rotor 1072 that is connected to and drives a low speed hydraulic pump 1074 through a gearbox 1076. The gearbox 1076 may be a mechanical gearbox, a hydraulic gearbox, or may include other types of gearboxes. A conduit 1078 connects a hydraulic fluid output of the hydraulic pump 1074 to a hydraulic motor 1080 that is mechanically connected to a generator 1082. The conduit 1078 also connects the hydraulic fluid output of the hydraulic pump 1074 to one or more actuators of a compressor/expander device 1020, that may be positioned in the tower 1016 of the wind turbine 1014. Each of the gear box 1076, hydraulic pump 1074, hydraulic motor 1080, and generator 1082 are shown positioned in the nacelle 1018 of the wind turbine 1014, but could be positioned elsewhere in other embodiments. One or more valves 1084 may control the flow of hydraulic fluid from the hydraulic pump 1074 to the hydraulic motor 1080 and/or compressor/expander device 1020, according to a mode in which the system is operating. The wind turbine 1014 also includes a storage structure 1086 that may be located in portions of the tower of the wind turbine 1014 and/or a storage structure 1022 in a foundation 1088 that supports the wind turbine 1014. In this respect, the wind turbine may provide for a self-contained energy storage and retrieval system that may prove beneficial for offshore applications.

The system of FIG. 8 may operate in different modes. In a first mode of operation, wind energy may be directed solely to the generator 1082 of the wind turbine 1014. In this mode, one or more valves 1084 may be positioned so that hydraulic power does not go to the compressor/expander device 1020, such that any power associated with wind driving the rotor 1072 is converted through the gear box 1076, the hydraulic pump 1074, the hydraulic motor 1080, and the generator 1082 into electricity. In a second mode of operation, wind energy may be used exclusively to drive the compressor/expander device 1020 to store energy as compressed air. In this mode, the one or more valves 1084 may be positioned such that hydraulic power is directed solely to the compressor/expander device 1020 from the hydraulic pump 1074. The valves 1084 may also be positioned such that hydraulic fluid from the hydraulic pump 1074 goes to the compressor/expander device 1020 and the combination of the hydraulic motor 1080 and generator 1082, such that wind energy may be used to compress air and to create electricity at a common time. When it is desirable to release energy that is stored in the system, compressed air may be released for expansion through the compressor/expander device 1020 in yet another mode of operation. Pressurized hydraulic fluid, output from the compressor/expander device 1020, may drive the generator 1082, through the hydraulic motor 1080, to create electric energy. This may occur either to assist the hydraulic pump 1074 that is being driven by the rotor 1072 when there is adequate wind, or as a sole source of pressurized hydraulic fluid, when there is inadequate wind to rotate the rotor 1072.

According to some embodiments, a system that is incorporated into the structure of a wind turbine may share components with the wind turbine itself, realizing additional and/or alternative efficiencies. By way of example, a compressor/expander device may utilize control software normally dedicated to the wind turbine or otherwise share control software and/or hardware with the wind turbine. The generator, gearbox, hydraulic pump, valves, and/or hydraulic motor may be common to both the compressor/expander device and the wind turbine to reduce the cost and number of components used in a system.

Figure 9:
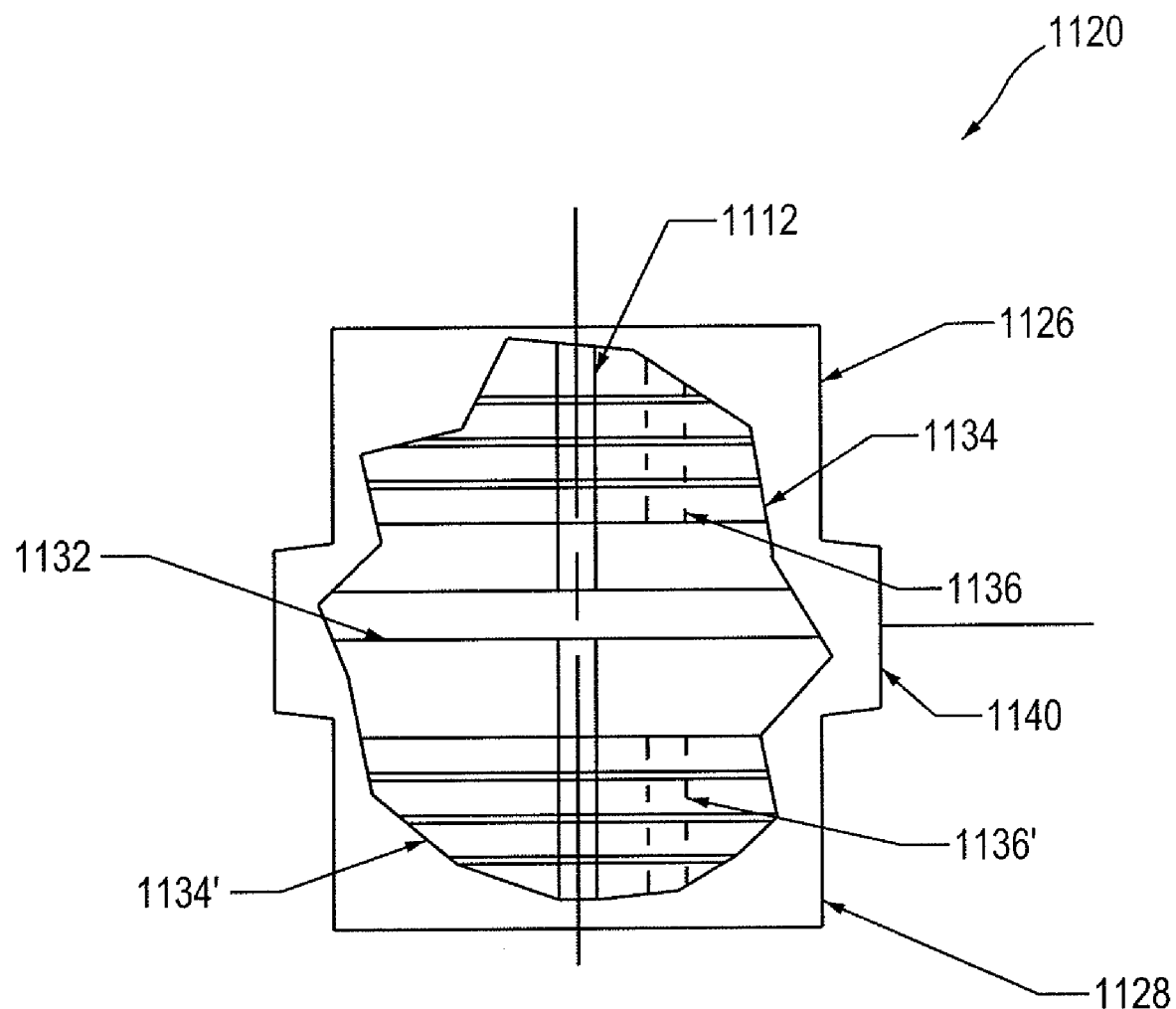
FIG. 9 shows a schematic, cross-sectional view of a compressor/expander device configured so that it may be incorporated into a tower of a wind turbine, according to one embodiment.

FIG. 9 shows a cross-sectional, schematic view of one embodiment of a compressor/expander device 1120 that may prove suitable for packaging within the tower of a wind turbine. As shown, first and second pressure vessels 1126 and 1128 are positioned vertically with respect to one another. The first pressure vessel 1126 includes dividers 1134 and a manifold 1136, and the second pressure vessel 1128 includes dividers 1134' and a manifold 1136'. The first and second pressure vessels 1126, 1128 are connected by a hydraulic actuator 112 and a housing 1140 that is wider in diameter than each of the pressure vessels 1126, 1128. A hydraulically actuated piston 1132 is disposed within the housing 1140. The larger width of the housing 1140, relative to the pressure vessels 1126, 1128, may reduce distances and, correspondingly, velocities traveled by liquid at a given operating speed. Reduced liquid velocities may, in turn, reduce liquid pumping resistance within the compressor/expander device 1120 to help improve the compressor/expander device 1120 operating efficiencies.

Figure 10:
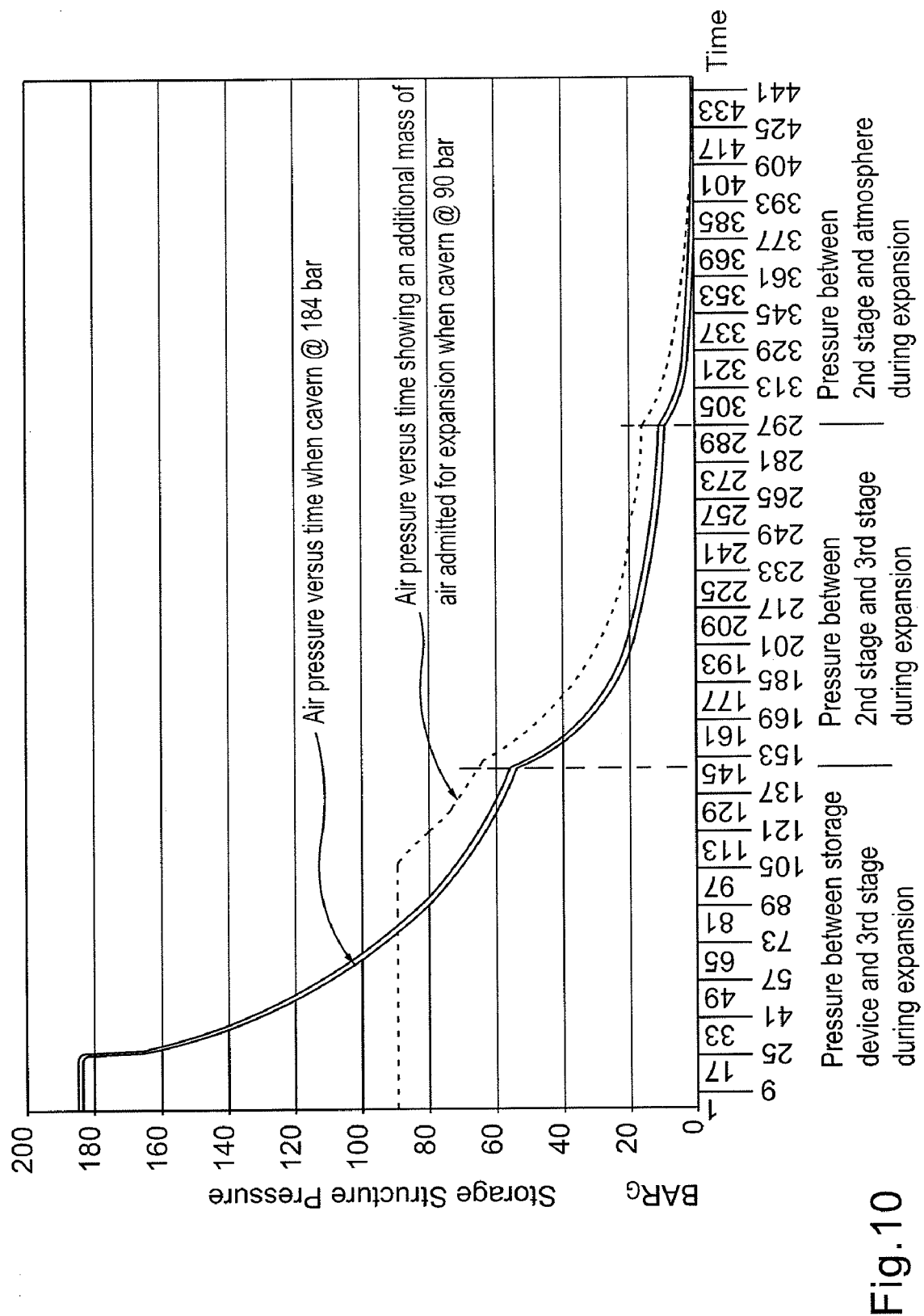
FIG. 10 shows a graph of pressure levels at different stages during expansion through a compressor/expander device for varying storage structure air pressures, according to one embodiment.

A compressor/expander device, according to some embodiments, may operate at a substantially constant output power when in an expansion mode for varying storage structure air pressure levels. FIG. 10 is a graph showing air pressures through each of three stages of a compressor/expander device for two storage structure pressure levels, according to one embodiment. As illustrated, air pressures throughout the expander devices may follow a similar but shifted curve after initial expansion to produce a similar amount of power for storage structure air pressures between 100 and 180 bar, represented by the dotted line in FIG. 10. It is understood that other pressure ranges, however, may alternatively be employed. Sensors, valves, controllers and other devices may be used to control a mass of air that enters the compressor/expander device from the storage structure to accomplish this. In one embodiment the final discharge pressure may be higher than ambient air pressure.

In another embodiment, the vessels and pumps are sized to admit a greater and adjustable volume of air during expansion than compression enabling them to generate the full rated power during expansion from the lowest storage pressure. A vessel/pump system designed according to this embodiment will only be fully utilized during expansion from the lowest design storage pressure. Further, a vessel/pump system designed according to this embodiment will always be fractionally used during compression. In another embodiment the final discharge pressure may approach ambient air pressure.

In another embodiment, regenerative heat exchange techniques can be used to extract heat energy from the air during compression (e.g. via the working liquid and/or the dividers) and to insert heat energy into the air during expansion (again, e.g. via the working liquid and/or the dividers). This functionality can be implemented using any of a variety of techniques that will be apparent to the artisan. For example, a regenerative heat exchange system can include a heat exchanger in thermal communication with the compressor/expander device (e.g. that circulates a suitable thermal working fluid through a heat exchanger, the other side of which is exposed directly to the air or working fluid in the compressor/expander device, or indirectly via the dividers or other intermediary heat transfer structure) and a heat energy storage reservoir (e.g. a an insulated storage tank for the thermal working fluid). During compression, the regenerative heat exchange system can be operated to circulate the thermal working fluid to extract heat energy from the air and to insert that heat energy into the storage reservoir. Conversely, during expansion, the regenerative heat exchange system can be operated to circulate the thermal working fluid to extract heat energy from the reservoir and to insert that heat energy into the air.

Heat removal from air that is being compressed and/or heat addition to air that is being expanded may help minimize temperature changes that occur in the air during these processes and, as described herein, may help a system achieve process conditions that are isothermal, or acceptably close to isothermal to be economically optimal. For example, as used herein, "isothermal" or "near isothermal" can means that the heat transfer process is characterized by a polytropic index of about 1.1 or less, and preferably about 1.05 or less. According to one embodiment, air experiences less than a change in temperature of about 1.6° C. or less throughout compression and/or expansion processes in a compressor/expander device (corresponding to a polytropic constant of 1.023). It is to be understood, however, that the system may also be operated in configurations that implement compression/expansion processes corresponding to a polytropic index greater than 1.1. For example, the equipment and/or operating costs required to operate a system so as to achieve a polytropic index of 1.05 may exceed the costs of the thermal inefficiencies in implementing an operating a system that achieves a polytropic index of greater than 1.1. It may therefore be desirable to implement the system so as to operate at the higher polytropic index.

Embodiments of the compressor expander device may be configured to reach operating speeds and/or power levels quickly to provide ancillary services to power facilities, including but not limited to, black start services, spinning reserve services, voltage support services, and/or frequency regulation services.

It is to be appreciated that, although described herein primarily for use with wind turbines and/or wind farms, embodiments of the compressor/expander device may be used with various types of power production facilities, including but not limited to solar power plants, coal fired power plants, gas fired power plants, nuclear power plants, geothermal power plants, biomass power plants, and/or hydro power plants, to name a few. In one embodiment, the thermal energy from a solar plant would be used through the device and process described herein rather than or in addition to a more traditional steam turbine or organic Rankine Cycle turbine, or other heat engine, as part or all of the heat source to improve the efficiency of generating power when expanding compressed air. The conversion efficiency of thermal energy to electric power from the solar plant may be 70%, 80%, and higher through this system.

Although the embodiments of a compressor/expander device are described herein for use in compressing or expanding air, it is to be appreciated that a compressor/expander device may be used to compress and/or expand any other gaseous substance, such as, but not limited to carbon dioxide, natural gas, oxygen, nitrogen, butane, propane, and other gasses. It is also to be appreciated that embodiments of the compressor/expander device are described herein for use with water or liquid, and that any other liquid-like substances that may also be used as a heat transfer and/or pressure transfer medium, including other types of coolants.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

In some embodiments, a device as described herein includes at least one pressure vessel in which air may be compressed and/or expanded. The at least one pressure vessel is at least partially filed with liquid and, at times, with air. The at least one pressure vessel is coupled to an actuator that moves the liquid in the volume to compress air in the pressure vessel or that is moved by air that is expanded within the pressure vessel to drive the actuator. The pressure vessel includes a plurality of dividers that hold air and/or are located throughout the pressure vessel so as to create a high area for thermal conduction to/from the air, the dividers, and the liquid. The dividers may substantially reduce the aggregate length of the heat path between air and liquid or structure, as compared to similarly constructed vessels that lack dividers. The dividers may substantially increase the total area of the air/liquid interface, as compared to similarly constructed vessels that lack dividers. Additionally, the dividers may provide an air/liquid interface and/or air/divider interface and/or liquid/divider interface that remains substantially constant in area throughout and toward the end of a compression or expansion cycle, where air temperature changes, absent heat transfer, might otherwise be the greatest. In some embodiments, the dividers may be arranged in a stack configuration with each divider in fluid communication with a manifold that, in turn, is in fluid communication with a port of the pressure vessel.

In some embodiments, a device as described herein can compress and/or expand air and includes two or more stages, arranged in series, that each include a first pressure vessel and a second pressure vessel and an actuator that is coupled to each of the first pressure vessel and the second pressure vessel. The volume of each of the first pressure vessel and second pressure vessel is at least partially filed with liquid that is moved within a corresponding pressure vessel by the actuator to alternately compress air and allow for the expansion of air in a portion of the corresponding volume that is not occupied by liquid. The actuator moves between the first pressure vessel and the second pressure vessel such that each of the first pressure vessel and the second pressure vessel are acting out of phase with one another. Actuators of each of the two or more stages of the device move out of phase with respect to actuators of any immediately upstream and/or downstream stages. According to some embodiments, dividers may be included in each of the pressure vessels to increase the area available for heat transfer to or from air that is being compressed and/or expanded.

In some embodiments, a device as described herein can compress and/or expand air isothermally or near isothermally. The device includes a pressure vessel at least partially filled with liquid. The pressure vessel is connected to an actuator that may move the liquid in the pressure vessel to compress air therein, or that may be moved by liquid that is displaced as air expands in the pressure vessel. The liquid is in contact with the air at one or more air/liquid interfaces and air/divider interfaces and liquid/divider interfaces, across which heat is transferred from air that is compressed and/or to air that is expanded. The pressure vessel also includes a heat exchanger, such as one or more heat pipes, that transfers heat between the liquid and an environment that is external to the device. Heat may be moved from air that is compressed and/or to air that is expanded to achieve isothermal or near isothermal compression and/or expansion processes. A relatively total heat transfer surface area (i.e., air/liquid interfaces and air/divider interfaces and liquid/divider interfaces) and/or relatively slow cycle speeds (e.g., 6 seconds for a single compression or expansion cycle) may help the device achieve isothermal or near isothermal compression and/or expansion.

In some embodiments, a plurality of devices as described herein can each cause energy to be stored by compressing air for storage and later release the compressed air, through the same plurality of devices, for expansion and the production of energy. Each of the plurality of devices are sized (e.g. less than 2 megawatts of capacity or less then 1.2 megawatts of capacity) such that typical installations, having power storage requirements 5 times, 10 times, 20 times, 50 times, 100 times, or 150 times, or even greater than the power storage capacity of a single device, may utilize any desirable number of devices, for example, up to 5 devices, up to 10 devices, up to 20 devices, up to 50 devices, up to 100 devices, up to 150 devices, or even greater numbers of devices to meet the power storage requirements at a particular installation. Having a plurality of devices may provide one or more benefits, including but not limited to the ability to easily store and/or release energy at rates associated with less than the full power storage capacity of an installation, the ability to remove individual devices or groups of devices from use for maintenance or repair without substantially impacting the operation of the overall installation, and/or the ability to construct individual devices at large volumes, realizing economies of scale and facilitating shipment and installation of devices.

In some embodiments, a device as described herein can compress air for the storage of energy as compressed air in a storage structure. The storage structure may hold air at varying pressure levels. The device also receives air from the storage structure, at varying pressure levels, and expands the air to release energy therefrom for the production of electric energy. According to some embodiments, the device is a positive displacement compressor and/or expander that may be operated in an expansion mode to expand air received at pressures levels that vary upward to as high as 250 atmospheres or more. According to some embodiments, the device may include multiple stages, arranged in series, for the compression and/or expansion of air.

In some embodiments, a device as described herein can compress air for the storage of energy as compressed air in a storage structure, and can expand pressurized air received from the storage structure to produce electric energy, when needed. Air may be stored in the storage structure at varying pressure levels. The device includes a pressure vessel and an actuator that moves liquid through the device across a substantially constant swept volume. The device includes valves and a controller that may be programmed to control a mass of air that is received by the device for expansion regardless of the pressure at which air is held in the storage structure.

In some embodiments, a device as described herein can compress air for the storage of energy as compressed air, and expand the compressed air, when needed, to produce energy. The device may be incorporated into the structure of wind turbine, such as in a nacelle or in the tower structure. According to some embodiments, the wind turbine and the device may share componentry to reduce overall system costs and/or reduce overall system size, which may prove particularly useful for offshore applications. By way of example, control software and/or hardware may be shared between the wind turbine and the device. Additionally or alternatively, a generator may be coupled both to a rotor of the wind turbine through a hydraulic motor and pump, and may be driven by the wind turbine when wind is adequate, and or by the device when compressed air when wind is not adequate.

In some embodiments, a device as described herein includes an upstream pressure vessel and a downstream pressure vessel in which air may be compressed. Each of the upstream pressure vessel and the downstream pressure vessel is at least partially filled with liquid and, at times, with air. A maximum volume available for air in the downstream pressure vessel is less than a maximum volume available for air in the upstream pressure vessel. The upstream pressure vessel is coupled to an upstream actuator and the downstream pressure vessel is coupled to a downstream actuator. Each of the upstream actuator and the downstream actuator move liquid in an internal volume of the corresponding pressure vessel to alternately increase and decrease a volume available for air in the corresponding pressure vessel. A conduit extends between the upstream pressure vessel and the downstream pressure vessel and includes a valve that may be selectively opened to provide fluid communication between the upstream pressure vessel and the downstream pressure vessel. Compression of air begins with the valve open to provide fluid communication between the upstream pressure vessel and the downstream pressure vessel. At the beginning of compression, the volume available for air in the upstream pressure vessel is at the maximum value and the volume available for air in the downstream pressure vessel is at a minimum value. The upstream actuator then moves liquid in the upstream pressure vessel to compress air in the volume available for air of the upstream pressure vessel, the conduit, and the volume available for air in the downstream pressure vessel. Simultaneously, the downstream actuator moves liquid in the downstream pressure vessel to increase the volume available for air in the downstream pressure vessel. Air is compressed in each of the volume available for air of the upstream pressure vessel, the conduit, and the volume available for air in the downstream pressure vessels as the magnitude of the decrease in the volume available for air in the upstream pressure vessel is greater than the magnitude of the increase in the volume available for air of the downstream pressure vessel.

While various embodiments of the invention have been described above, it should be understood that they have been presented by way of example only, and not limitation. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

For example, although various embodiments have been described as having particular features and/or combinations of components, other embodiments are possible having any combination or sub-combination of any features and/or components from any of the embodiments described herein. The specific configurations of the various components can also be varied. For example, the size and specific shape of the various components can be different than the embodiments shown, while still providing the functions as described herein.

The compressor/expander units may be arranged modularly in a project, and they may be placed outside or inside a building. In the building, they may be arranged in a configuration with a central aisle, with the units adjacent to each other on either side of the aisle. The compressor/expander units may be interconnected with each other with some or all of the following: electricity, water, hydraulic fluid, air, lubricating oil, hot water, cold water, and other common services. There may be separate stores and/or sources of hot and/or cold water for the compressor/expanders.

What is claimed is:

1. An apparatus for use in a compressed gas-based energy storage and recovery system, the apparatus comprising:
    a pressure vessel defining an interior region in which at least one of a liquid or a gas can be contained;
    a plurality of downwardly opening dividers arranged in a stack, the stack positioned in the interior region of the pressure vessel to divide the interior region into a plurality of sub-regions; and
    a manifold extending through the stack of dividers and in fluid communication with the plurality of sub-regions.

2. The apparatus of claim 1, wherein each of the downwardly opening dividers are configured to contain gas and provide a gas to liquid interface for transferring heat energy.

3. The apparatus of claim 1, wherein each of the downwardly opening dividers provide a gas to divider interface for transferring heat energy.

4. The apparatus of claim 2, wherein the gas to liquid interface has surface area and each of the downwardly opening dividers is configured to contain gas in contact with liquid at a substantially constant gas to liquid interface surface area as liquid is moved to or from the interior region of the pressure vessel.

5. The apparatus of claim 1, wherein each of the downwardly opening dividers include a substantially vertical sidewall and an upper wall that form a dish-shaped structure.

6. The apparatus of claim 5, wherein the pressure vessel includes a substantially vertical sidewall, and wherein the substantially vertical sidewall of each of the downwardly opening dividers conforms to the substantially vertical sidewall of the pressure vessel.

7. The apparatus of claim 1, further comprising:
    heat transfer fins disposed on at least one of the plurality of downwardly opening dividers.

8. An apparatus for use in a compressed gas-based energy storage and recovery system, the apparatus comprising:
    a pressure vessel defining an interior region in which at least one of a liquid or a gas can be contained;
    a plurality of dividers positioned in the interior region of the pressure vessel to divide the interior region into a plurality of sub-regions, each configured to contain gas and provide a gas to liquid interface, at least one of the dividers having a substantially vertical sidewall and an upper wall that form a dish-shaped structure; and
    a manifold having one or more apertures adjacent to the upper wall of the divider to allow fluid communication between the gas contained by the divider and the manifold.

9. The apparatus of claim 8, further comprising:
    a manifold in fluid communication with the gas contained by each of the dividers.

10. The apparatus of claim 8, wherein at least one of the dividers has a domed upper wall.

11. The apparatus of claim 8, wherein at least one of the dividers has a flared sidewall.

* * * * *